United States Patent
Zhang

(10) Patent No.: US 12,411,311 B2
(45) Date of Patent: Sep. 9, 2025

(54) CAMERA OPTICAL LENS

(71) Applicant: AAC Optics (Suzhou) Co., Ltd., Suzhou (CN)

(72) Inventor: Ye Zhang, Suzhou (CN)

(73) Assignee: AAC Optics (Suzhou) Co., Ltd., Suzhou (CN)

( * ) Notice: Subject to any disclaimer, the term of this patent is extended or adjusted under 35 U.S.C. 154(b) by 355 days.

(21) Appl. No.: 18/324,122

(22) Filed: May 25, 2023

(65) Prior Publication Data
US 2024/0248284 A1    Jul. 25, 2024

(30) Foreign Application Priority Data
Jan. 19, 2023 (CN) .......................... 202310066885.4

(51) Int. Cl.
*G02B 9/64* (2006.01)
*G02B 13/00* (2006.01)

(52) U.S. Cl.
CPC ........... *G02B 9/64* (2013.01); *G02B 13/0045* (2013.01)

(58) Field of Classification Search
CPC .. G02B 9/64; G02B 13/0045; G02B 13/0015; G02B 13/006; G02B 13/06; G02B 13/18
USPC ........................................................ 359/755
See application file for complete search history.

(56) References Cited

U.S. PATENT DOCUMENTS

| | | | | |
|---|---|---|---|---|
| 6,795,255 B2* | 9/2004 | Reinecke | ............... | G02B 13/22 359/755 |
| 7,057,830 B2* | 6/2006 | Ebbesmeier | ............. | G02B 9/64 359/755 |
| 7,796,348 B2* | 9/2010 | Lin | ......... | G02B 13/06 359/755 |
| 7,944,626 B2* | 5/2011 | Lin | ......... | G02B 13/06 359/755 |
| 11,733,483 B2* | 8/2023 | Zhang | ................... | G02B 13/16 359/755 |
| 11,789,240 B2* | 10/2023 | Komiyama | ........ | G02B 27/0025 359/755 |
| 2003/0112525 A1* | 6/2003 | Reinecke | ............... | G02B 13/22 359/754 |
| 2005/0117225 A1* | 6/2005 | Ebbesmeier | ........... | G02B 13/02 359/649 |
| 2009/0052057 A1* | 2/2009 | Lin | ......... | G02B 13/06 359/751 |
| 2010/0284095 A1* | 11/2010 | Lin | ......... | G02B 13/06 359/794 |

(Continued)

*Primary Examiner* — William R Alexander
(74) *Attorney, Agent, or Firm* — Wiersch Law Group

(57) ABSTRACT

A camera optical lens is provided, including from an object side to an image side: a first lens; a second lens; a third lens; a fourth lens; a fifth lens; a sixth lens; and a seventh lens, the camera optical lens satisfies following conditions: $1.30 \leq f7/f \leq 4.00$; $1.70 \leq n1$; $2.00 \leq f34/f \leq 7.00$; and $120.00 \leq (FOV \times f)/IH$, where f denotes a focal length of the camera optical lens; f7 denotes a focal length of the seventh lens; f34 denotes a combined focal length of the third lens and the fourth lens; n1 denotes a refractive index of the first lens; FOV denotes a field of view of the camera optical lens; and IH denotes an image height of the camera optical lens. The camera optical lens has good optical performance such as large aperture, ultra-thinness and wide angle while ensuring miniaturization, small chromatic aberration, small lateral color, and high resolution up to 5M.

16 Claims, 15 Drawing Sheets

(56) References Cited

U.S. PATENT DOCUMENTS

| | | | |
|---|---|---|---|
| 2013/0242414 A1* | 9/2013 | Iwamoto | G02B 13/04 |
| | | | 359/755 |
| 2021/0003820 A1* | 1/2021 | Zhang | G02B 13/16 |
| 2021/0191087 A1* | 6/2021 | Komiyama | G02B 27/0025 |
| 2023/0161137 A1* | 5/2023 | Tsai | G02B 9/60 |
| | | | 359/755 |
| 2023/0296864 A1* | 9/2023 | Son | G02B 13/04 |
| | | | 359/755 |

* cited by examiner

CAMERA OPTICAL LENS

TECHNICAL FIELD

The present disclosure relates to the technical field of optical lens and, in particular, to a camera optical lens suitable for handheld terminal devices such as smart phones or digital cameras, and imaging devices such as monitors or PC lenses.

BACKGROUND

With the rise of smart phones in recent years, the demand for miniature camera lens is continuously increasing, and since the pixel size of the photo sensors become smaller, along with the current development trend of electronic products that requires better performance such—as thinner and smaller dimensions, miniature camera lenses with good imaging quality therefore have become a mainstream in the market. In order to obtain better imaging quality, a structure with multiple lenses is generally used. Moreover, with development of technology and increase in diversified requirements of users, a camera lens constituted by seven lenses gradually appears in camera lens design, in case that pixel area of the photosensitive device is continuously reduced and requirements on imaging quality is continuously increased. A wide-angle camera optical lens having good optical performance is urgently needed.

SUMMARY

In view of the above problems, the present disclosure provides a camera optical lens, which has good optical performance such as large aperture, ultra-thinness and wide angle while taking into account characteristics of miniaturization, small chromatic aberration, small lateral color, high resolution up to 5M, and also has a long back focal length for easy assembling and low cost.

Embodiments of the present disclosure provide a camera optical lens, including from an object side to an image side: a first lens; a second lens; a third lens; a fourth lens; a fifth lens; a sixth lens; and a seventh lens, the camera optical lens satisfies following conditions: $1.30 \leq f7/f \leq 4.00$; $1.70 \leq n1$; $2.00 \leq f34/f \leq 7.00$; and $120.00 \leq (FOV \times f)/IH$, where f denotes a focal length of the camera optical lens; f7 denotes a focal length of the seventh lens; f34 denotes a combined focal length of the third lens and the fourth lens; n1 denotes a refractive index of the first lens; FOV denotes a field of view of the camera optical lens; and IH denotes an image height of the camera optical lens.

As an improvement, the camera optical lens satisfies a following condition: $1.00 \leq f5/f \leq 3.00$, where f5 denotes a focal length of the fifth lens.

As an improvement, the camera optical lens satisfies following conditions: $d10=0$; and $0.40 \leq |f5/f6| \leq 3.00$, where d10 denotes an on-axis distance from an image-side surface of the fifth lens to an object-side surface of the sixth lens; f5 denotes a focal length of the fifth lens; and f6 denotes a focal length of the sixth lens.

As an improvement, the camera optical lens satisfies a following condition: $0.35 \leq BF/TL$, where BF denotes an on-axis distance from an image-side surface of the seventh lens to an image plane of the camera optical lens; and TL denotes an on-axis distance from an object-side surface of the first lens to the image-side surface of the seventh lens.

As an improvement, the camera optical lens satisfies a following condition: $0.01 \leq (d4+d0)/TTL \leq 0.10$, where d4 denotes an on-axis distance from an image-side surface of the second lens to an aperture; d0 denotes an on-axis distance from the aperture to an object-side surface of the third lens; and TTL denotes a total optical length from an object-side surface of the first lens to an image plane of the camera optical lens along an optic axis.

As an improvement, the camera optical lens satisfies a following condition: $0 < D/IH/FOV \leq 0.10$, where D denotes a light passing diameter of an object-side surface of the first lens corresponding to a maximum field of view of the camera optical lens.

As an improvement, the camera optical lens satisfies a following condition: $0 < TTL/IH/FOV \leq 0.06$, where TTL denotes a total optical length from an object-side surface of the first lens to an image plane of the camera optical lens along an optic axis.

As an improvement, the camera optical lens satisfies following conditions: $d6=0$; and $d10=0$, where d6 denotes an on-axis distance from an image-side surface of the third lens to an object-side surface of the fourth lens; and d10 denotes an on-axis distance from an image-side surface of the fifth lens to an object-side surface of the sixth lens.

As an improvement, an object-side surface of the first lens is convex in a paraxial region, and an image-side surface of the first lens is concave in the paraxial region; the first lens has a negative refractive power; and the camera optical lens satisfies following conditions: $-3.09 \leq f1/f \leq -0.60$; $0.57 \leq (R1+R2)/(R1-R2) \leq 1.88$; and $0.02 \leq d1/TTL \leq 0.05$, where f1 denotes a focal length of the first lens; R1 denotes a central curvature radius of the object-side surface of the first lens; R2 denotes a central curvature radius of the image-side surface of the first lens; d1 denotes an on-axis thickness of the first lens; and TTL denotes a total optical length from an object-side surface of the first lens to an image plane of the camera optical lens along an optic axis.

As an improvement, the camera optical lens satisfies following conditions: $-10.46 \leq f2/f \leq 19.43$; $-4.44 \leq (R3+R4)/(R3-R4) \leq 22.86$; and $0.03 \leq d3/TTL \leq 0.09$, where f2 denotes a focal length of the second lens; R3 denotes a central curvature radius of an object-side surface of the second lens; R4 denotes a central curvature radius of an image-side surface of the second lens; d3 denotes an on-axis thickness of the second lens; and TTL denotes a total optical length from an object-side surface of the first lens to an image plane of the camera optical lens along an optic axis.

As an improvement, the camera optical lens satisfies following conditions: $-9.86 \leq f3/f \leq 1.77$; $-1.65 \leq (R5+R6)/(R5-R6) \leq 0.53$; and $0.01 \leq d5/TTL \leq 0.14$, where f3 denotes a focal length of the third lens; R5 denotes a central curvature radius of an object-side surface of the third lens; R6 denotes a central curvature radius of an image-side surface of the third lens; d5 denotes an on-axis thickness of the third lens; and TTL denotes a total optical length from an object-side surface of the first lens to an image plane of the camera optical lens along an optic axis.

As an improvement, the camera optical lens satisfies following conditions: $-3.27 \leq f4/f \leq 2.38$; $-0.14 \leq (R7+R8)/(R7-R8) \leq 1.27$; and $0.01 \leq d7/TTL \leq 0.23$, where f4 denotes a focal length of the fourth lens; R7 denotes a central curvature radius of an object-side surface of the fourth lens; R8 denotes a central curvature radius of an image-side surface of the fourth lens; d7 denotes an on-axis thickness of the fourth lens; and TTL denotes a total optical length from an object-side surface of the first lens to an image plane of the camera optical lens along an optic axis.

As an improvement, an object-side surface of the fifth lens is convex in a paraxial region and an image-side surface of the fifth lens is convex in the paraxial region; the fifth lens has positive refractive power; the camera optical lens satisfies following conditions: $-0.42 \leq (R9+R10)/(R9-R10) \leq 0.84$; and $0.05 \leq d9/TTL \leq 0.22$, where R9 denotes a central curvature radius of an object-side surface of the fifth lens; R10 denotes a central curvature radius of an image-side surface of the fifth lens; d9 denotes an on-axis thickness of the fifth lens; and TTL denotes a total optical length from an object-side surface of the first lens to an image plane of the camera optical lens along an optic axis.

As an improvement, an object-side surface of the sixth lens is concave in a paraxial region; the sixth lens has negative refractive power; the camera optical lens satisfies following conditions: $-2.88 \leq f6/f \leq -0.76$; $-2.78 \leq (R11+R12)/(R11-R12) \leq 0.42$; and $0.01 \leq d11/TTL \leq 0.16$, where f6 denotes a focal length of the sixth lens; R11 denotes a central curvature radius of an object-side surface of the sixth lens; R12 denotes a central curvature radius of an image-side surface of the sixth lens; d11 denotes an on-axis thickness of the sixth lens; and TTL denotes a total optical length from an object-side surface of the first lens to an image plane of the camera optical lens along an optic axis.

As an improvement, an object-side surface of the seventh lens is convex in a paraxial region and an image-side surface of the seventh lens is convex in the paraxial region; the seventh lens has positive refractive power; the camera optical lens satisfies following conditions: $-0.50 \leq (R13+R14)/(R13-R14) \leq 0.28$; and $0.05 \leq d13/TTL \leq 0.20$, where R13 denotes a central curvature radius of an object-side surface of the seventh lens; R14 denotes a central curvature radius of an image-side surface of the seventh lens; d13 denotes an on-axis thickness of the seventh lens; and TTL denotes a total optical length from an object-side surface of the first lens to an image plane of the camera optical lens along an optic axis.

As an improvement, at least one of the first lens, the second lens, the third lens, the fourth lens, the fifth lens, the sixth lens, and the seventh lens is made of glass material.

The present disclosure has following beneficial effects: the camera optical lens of the present disclosure has good optical performance such as large aperture, ultra-thinness and wide angle while taking into account characteristics of miniaturization, small chromatic aberration, small lateral color, high resolution up to 5M, and also has a long back focal length for easy assembling and low cost, which is especially suitable for mobile phone camera lens components and WEB camera lens that are composed of high-pixel CCD, CMOS and other imaging elements, respectively.

BRIEF DESCRIPTION OF DRAWINGS

Many aspects of the exemplary embodiments may be better understood with reference to following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

In order to better illustrate the objectives, technical solutions and advantages of the present disclosure, the present disclosure will be described in further detail below with reference to the accompanying drawings and embodiments. It should be understood that the specific embodiments described herein are only used to explain the present disclosure but are not used to limit the present disclosure.

Embodiment 1

Figure 1:
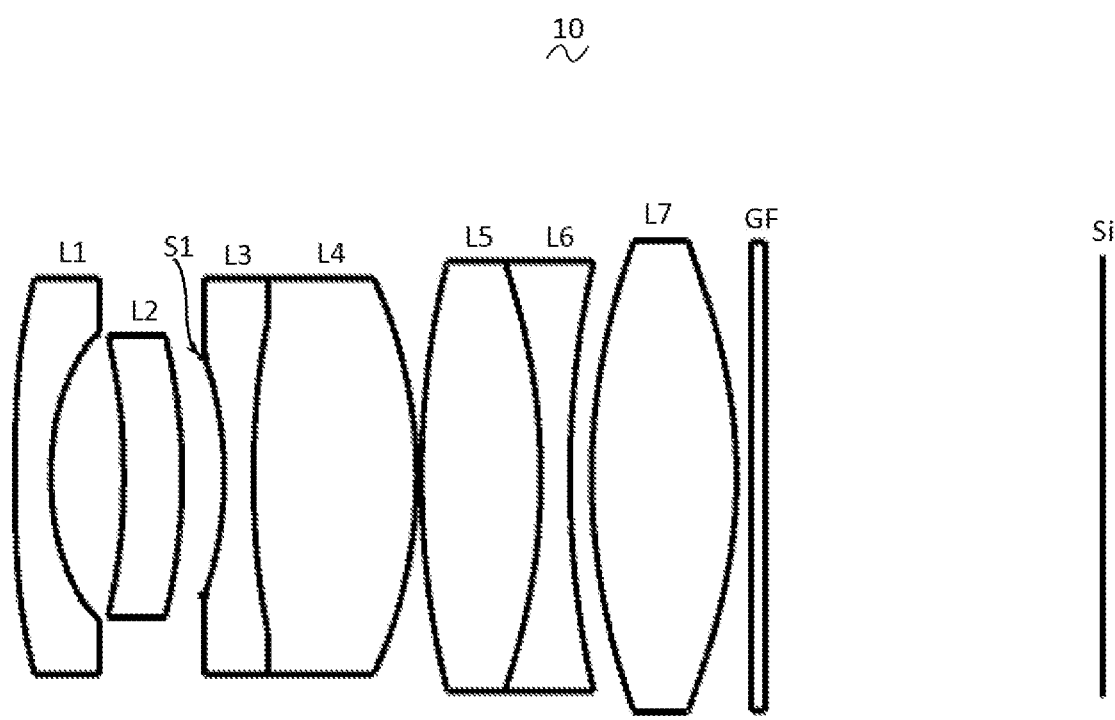
FIG. 1 is a structural schematic diagram of a camera optical lens according to Embodiment 1 of the present disclosure.

Referring to FIG. 1, the present disclosure provides a camera optical lens 10. FIG. 1 is a structural schematic diagram of a camera optical lens 10 according to Embodiment 1 of the present disclosure. The camera optical lens 10 includes seven lenses. The camera optical lens 10 includes, from an object side at the left to an image side at the right, a first lens L1, a second lens L2, an aperture S1, a third lens L3, a fourth lens L4, a fifth lens L5, a sixth lens L6, and a seventh lens L7. An optical element such as an optical filter GF may be arranged between the seventh lens L7 and an image plane Si.

In this embodiment, the first lens L1, the second lens L2, the third lens L3, the fourth lens L4, the fifth lens L5, the sixth lens L6, and the seventh lens L7 are each made of a glass material. In other embodiments, the lenses may also be made of other materials.

A focal length of the camera optical lens 10 is defined as f, and a focal length of the seventh lens L7 is defined as f7. A following condition is satisfied: $1.30 \leq f7/f \leq 4.00$. This condition specifies a ratio of the focal length f7 of the seventh lens L7 to the focal length f of the camera optical lens 10. Within the range of the above condition, it is beneficial to receive light and ensure the amount of light passing therethrough, so that the camera optical lens 10 has a small CRA (an incidence angle of main light toward the image plane is defined as CRA), and CRA<17.5°.

A refractive index of the first lens L1 is defined as n1. A following condition is satisfied: $1.70 \leq n1$. This condition specifies a range of refractive index of the material used in the first lens L1. Within the range of the above condition, it is beneficial to reducing a diameter of front opening and improving imaging quality.

The focal length of the camera optical lens 10 is defined as f, and a combined focal length of the third lens L3 and the fourth lens L4 is defined as f34. A following condition is satisfied: $2.00 \leq f34/f \leq 7.00$. This condition specifies a ratio of the combined focal length f34 of the third lens L3 and the fourth lens L4 to the focal length f of the camera optical lens 10. Within the range of the above condition, the orientation of light between the first lens L1 and the fourth lens L4 can be effectively controlled, and the aberration caused by the large-angle light passing through the first lens L1 can be reduced, while the camera optical lens 10 has a compact structure, which is beneficial to miniaturization.

The focal length of the camera optical lens 10 is defined as f, a field of view of the camera optical lens 10 is defined as FOV, an image height of the camera optical lens 10 is defined as IH. A following condition is satisfied: $120.00 \leq (FOV \times f)/IH$. This condition specifies a ratio of product of the field of view FOV of the camera optical lens 10 and the focal length f of the camera optical lens 10 to the image height IH of the camera optical lens 10. Within the range of the above condition, the camera optical lens 10 can be designed with both long focal length and large field of view.

The focal length of the camera optical lens 10 is defined as f, and the focal length of the fifth lens L5 is defined as f5. A following condition is satisfied: $1.00 \leq f5/f \leq 3.00$. This condition specifies a ratio of the focal length f5 of the fifth lens L5 to the focal length f of the camera optical lens 10. By controlling the focal length reasonably, within the range of the above condition, it is beneficial to controlling temperature drift and thus has good temperature performance.

The focal length of the fifth lens L5 is defined as f5, and a focal length of the sixth lens L6 is defined as f6. An on-axis distance from an image-side surface of the fifth lens L5 to an object-side surface of the sixth lens L6 is defined as d10. Following conditions are satisfied: d10-0; and $0.40 \leq |f5/f6| \leq 3.00$. A ratio of the focal length f5 of the lens L5 to the focal length f6 of the lens L6 is specified. Within the range of the above condition, the absolute values of focal length of two lens of glued lenses are close to each other, it is beneficial to smooth transition of light, improving imaging quality, and causing the chromatic aberration to be $|LC| \leq 10$ μm.

An on-axis distance from the image-side surface of the seventh lens L7 to the image plane is defined as BF, and an on-axis distance from the image-side surface of the first lens L1 to the image-side surface of the seventh lens L7 is TL. A following condition is satisfied: $0.35 \leq BF/TL$. This condition specifies a ratio of the on-axis distance BF from the image-side surface of the seventh lens L7 to the image plane to the on-axis distance from the image-side surface of the first lens L1 to the image-side surface of the seventh lens L7. On the basis of miniaturization, the back focal length is long, which is beneficial to assembling the modules. A length TL of lens group TL is short, the structure is compact, which is beneficial to reducing the sensitivity of the lens to MTF, improving the production yield and reducing the production cost.

A total optical length from an object-side surface of the first lens to an image plane of the camera optical lens 10 along an optic axis is defined as TTL, an on-axis distance from an image-side surface of the second lens L2 to an aperture S1 is defined as d4, and an on-axis distance from the aperture S1 to an object-side surface of the third lens L3 is defined d0. A following condition is satisfied: $0.01 \leq (d4+d0)/TTL \leq 0.10$. This condition specifies a ratio of the on-axis distance from the second lens L2 to the third lens L3 to the total length TTL of the camera optical lens. Within the range of the above condition, the distance between two lenses adjacent to the aperture S1 is increased, which is beneficial to improving the imaging quality.

The field of view of the camera optical lens 10 is defined as FOV, and the image height of the camera optical lens 10 is defined as IH. A light passing diameter of an object-side surface of the first lens L1 corresponding to a maximum field of view of the camera optical lens 10 is defined as D. A following condition is satisfied: $0 < D/IH/FOV \leq 0.10$. Within the range of the above condition, it is beneficial to achieving miniaturization and small diameter of front opening.

The field of view of the camera optical lens 10 is defined as FOV, the image height of the camera optical lens 10 is defined as IH, and the optical total length of the camera optical lens is TTL. A following condition is satisfied: $0 < TTL/IH/FOV \leq 0.06$. Within the range of the above condition, it is beneficial to achieving miniaturization and small diameter of front opening.

An on-axis distance from an image-side surface of the third lens L3 to an object-side surface of the fourth lens L4 is defined as d6, and an on-axis distance from an image-side surface of the fifth lens L5 to an object-side surface of the sixth lens L6 is defined as d10. A following condition is satisfied: d6=0; d10=0. The use of two sets of glued lenses is not only beneficial to correcting aberration to achieve high resolution, but also to reducing the problems of tolerance sensitivity of lens units such as tilt/core shift caused in the assembling process.

In this embodiment, the first lens L1 has a negative refractive power. An object-side surface of the first lens L1 is convex in a paraxial region, and an image-side surface of the first lens L1 is concave in the paraxial region. In other embodiments, the first lens L1 may also have a positive refractive power, and the object-side surface and image-side surface of the first lens L1 may also have other concave or convex distribution in the paraxial region.

The focal length of the camera optical lens 10 is defined as f, and the focal length of the first lens L1 is defined as f1. A following condition is satisfied: −3.09≤f1/f≤−0.60. This condition specifies a ratio of the focal length f1 of the first lens L1 to the focal length f of the camera optical lens 10. Within the range of the above condition, the first lens has an appropriate negative refractive power, which is beneficial to reducing the aberration of the system while developing ultra-thinness and wide angle of the lens. Optionally, a following condition is satisfied: −1.93≤f1/f≤−0.75.

A central curvature radius of the object-side surface of the first lens L1 is defined as R1, and a central curvature radius of the image-side surface of the first lens L1 is R2. A following condition is satisfied: 0.57≤(R1+R2)/(R1−R2)≤1.88. The shape of the first lens L1 is controlled reasonably, so that the first lens L1 can effectively correct the spherical aberration of the camera optical lens 10. Optionally, a following condition is satisfied: 0.91≤(R1+R2)/(R1−R2)≤1.51.

A total optical length from an object-side surface of the first lens to an image plane of the camera optical lens 10 along an optic axis is defined as TTL, and an on-axis thickness of the first lens L1 is defined as d1. A following condition is satisfied: 0.02≤d1/TTL≤0.05. Within the range of the above condition, it is beneficial to achieving ultra-thinness. Optionally, a following condition is satisfied: 0.03≤d1/TTL≤0.04.

In this embodiment, the second lens L2 has a positive refractive power. An object-side surface of the second lens L2 is concave in a paraxial region, and an image-side surface of the second lens L2 is convex in the paraxial region. In other embodiments, the second lens L2 may also have a negative refractive power, and the object-side surface and image-side surface of the second lens L2 may also have other concave or convex distribution in the paraxial region.

The focal length of the camera optical lens 10 is defined as f, and the focal length of the second lens L2 is defined as f2. A following condition is satisfied: −10.46≤f2/f≤19.43. By controlling the optical focal length of the second lens L2 within a reasonable range, it is beneficial to correct the aberration of the camera optical lens 10. Optionally, a following condition is satisfied: −6.54≤f2/f≤15.54.

A central curvature radius of the object-side surface of the second lens L2 is defined as R3, and a central curvature radius of the image-side surface of the second lens L2 is defined as R4. A following condition is satisfied: −4.44≤(R3+R4)/(R3−R4)≤22.86, which specifies the shape of the second lens L2. Within the range of the above condition, with the development of the camera optical lens 10 to ultra-thinness and wide angle, it is beneficial to correcting the on-axis chromatic aberration. Optionally, a following condition is satisfied:

$$-2.78 \le (R3 + R4)/(R3 - R4) \le 18.29.$$

A total optical length from an object-side surface of the first lens to an image plane of the camera optical lens 10 along an optic axis is defined as TTL, and the on-axis thickness of the second lens L2 is defined as d3. A following condition is satisfied: 0.03≤d3/TTL≤0.09. Within the range of the above condition, it is beneficial to achieving ultra-thinness. Optionally, a following condition is satisfied: 0.04≤d3/TTL≤0.07.

In this embodiment, the third lens L3 has a negative refractive power. An object-side surface of the third lens L3 is concave in a paraxial region, and an image-side surface of the third lens L3 is concave in the paraxial region. In other embodiments, the third lens L3 may also have a positive refractive power, and the object-side surface and image-side surface of the third lens L3 may also have other concave or convex distribution in the paraxial region.

The focal length of the camera optical lens 10 is defined as f, and the focal length of the third lens L3 is defined as f3. A following condition is satisfied: −9.86≤f3/f≤1.77. The optical focal length is controlled reasonably, so that the camera optical lens 10 has better imaging quality and lower sensitivity. Optionally, a following condition is satisfied:

$$-6.17 \le f3/f \le 1.42.$$

A central curvature radius of the object-side surface of the third lens L3 is defined as R5, and a central curvature radius of the image-side surface of the third lens L3 is defined as R6. A following condition is satisfied: −1.65≤(R5+R6)/(R5−R6)≤0.53, which specifies the shape of the third lens L3. Within the range of the above condition, it is beneficial to molding the third lens L3, which can alleviate the deflection degree of light passing through the lens and effectively reduce the aberration. Optionally, a following condition is satisfied:

$$-1.03 \le (R5 + R6)/(R5 - R6) \le 0.43.$$

A total optical length from an object-side surface of the first lens to an image plane of the camera optical lens 10 along an optic axis is defined as TTL, and an on-axis thickness of the third lens L3 is defined as d5. A following condition is satisfied: 0.01≤d5/TTL≤0.14. Within the range of the above condition, it is beneficial to achieving ultra-thinness. Optionally, a following condition is satisfied: 0.02≤d5/TTL≤0.11.

In this embodiment, the fourth lens L4 has a positive refractive power. The object-side surface of the fourth lens L4 is convex in the paraxial region, and the image side of the fourth lens L4 is convex in the paraxial region. In other embodiments, the fourth lens L4 may also have a negative refractive power, and the object-side surface and image-side surface of the fourth lens L4 may also have other concave or convex distribution in the paraxial region.

The focal length of the camera optical lens 10 is defined as f, and a focal length of the fourth lens L4 is defined as f4. A following condition is satisfied: −3.27≤f4/f≤2.38, which specifies a ratio of the focal length f4 of the fourth lens L4 to the focal length f of the camera optical lens 10. The optical focal length is controlled reasonably, so that the camera optical lens 10 has better imaging quality and lower sensitivity. Optionally, a following condition is satisfied: −2.05≤f4/f≤1.90.

A central curvature radius of the object-side surface of the fourth lens L4 is defined as R7, and a central curvature radius of the image-side surface of the fourth lens L4 is defined as R8. A following condition is satisfied: −0.14≤(R7+R8)/(R7−R8)≤1.27, which specifies the shape of L4 of the fourth lens. Within the range of the above condition, with the development of ultra-thinness and wide angle, it is beneficial to correcting aberration of off-axis angle. Optionally, a following condition is satisfied: −0.09≤(R7+R8)/(R7−R8)≤1.01.

A total optical length from an object-side surface of the first lens to an image plane of the camera optical lens 10 along an optic axis is defined as TTL, and an on-axis thickness of the fourth lens L4 is defined as d7. A following condition is satisfied: 0.01≤d7/TTL≤0.23. Within the range of the above condition, it is beneficial to achieving ultra-thinness. Optionally, a following condition is satisfied: 0.02≤d7/TTL≤0.19.

In this embodiment, the fifth lens L5 has a positive refractive power. The object-side surface of the fifth lens L5 is convex in the paraxial region, and the image side of the fifth lens L5 is convex in the paraxial region. In other embodiments, the fifth lens L5 may also have a negative refractive power, and the object-side surface and image-side surface of the fifth lens L5 may also have other concave or convex distribution in the paraxial region.

A central curvature radius of the object-side surface of the fifth lens L5 is defined as R9, and a central curvature radius of the image-side surface of the fifth lens L5 is defined as R10. A following condition is satisfied: −0.42≤(R9+R10)/(R9−R10)≤0.84, which specifies the shape of the fifth lens L5. Within the range of the above condition, with the development of ultra-thinness and wide-angle, it is beneficial to correcting aberration of off-axis angle. Optionally, a following condition is satisfied: −0.26≤(R9+R10)/(R9−R10)≤0.67.

A total optical length from an object-side surface of the first lens to an image plane of the camera optical lens 10 along an optic axis is defined as TTL, and an on-axis thickness of the fifth lens L5 is defined as d9. A following condition is satisfied: 0.05≤d9/TTL≤0.22. Within the range of the above condition, it is beneficial to achieving ultra-thinness. Optionally, a following condition is satisfied: 0.09≤d9/TTL≤0.17.

In this embodiment, the sixth lens L6 has a negative refractive power. The object-side surface of the sixth lens L6 is concave in the paraxial region, and the image side of the sixth lens L6 is concave in the paraxial region. In other embodiments, the sixth lens L6 may also have a positive refractive power, and the object-side surface and image-side surface of the sixth lens L6 may also have other concave or convex distribution in the paraxial region.

The focal length of the optical lens 10 is defined as f, and the focal length of the sixth lens L6 is defined as f6. A following condition is satisfied: −2.88≤f6/f≤−0.76. The optical focal length is controlled reasonably, so that the camera optical lens 10 has better imaging quality and lower sensitivity. Optionally, a following condition is satisfied: −1.80≤f6/f≤−0.95.

A central curvature radius of the object-side surface of the sixth lens L6 is defined as R11 and a central curvature radius of the image-side surface of the sixth lens L6 is defined as R12. A following condition is satisfied: −2.78≤(R11+R12)/(R11−R12)≤0.42, which specifies the shape of the sixth lens L6. Within the range of the above condition, with the development of ultra-thinness and wide angle, it is beneficial to correcting aberration of off-axis angle. Optionally, a following condition is satisfied: −1.74≤(R11+R12)/(R11−R12)≤0.33.

A total optical length from an object-side surface of the first lens to an image plane of the camera optical lens 10 along an optic axis is defined as TTL, and an on-axis thickness of the sixth lens L6 is defined as d11. A following condition is satisfied: 0.01≤d11/TTL≤0.16. Within the range of the above condition, it is beneficial to achieving ultra-thinness. Optionally, a following condition is satisfied: 0.02≤d11/TTL≤0.12.

In this embodiment, the seventh lens L7 has a positive refractive power. The object-side surface of the seventh lens L7 is convex in the paraxial region, and the image side of the seventh lens L7 is convex in the paraxial region. In other embodiments, the seventh lens L7 may also have a negative refractive power, and the object-side surface and image-side surface of the seventh lens L7 may also have other concave or convex distribution in the paraxial region.

A central curvature radius of the object-side surface of the seventh lens L7 is defined as R13, and a central curvature radius of the image-side surface of the seventh lens L7 is defined as R14. A following condition is satisfied: −0.50≤(R13+R14)/(R13−R14)≤0.28, which specifies the shape of the seventh lens L7. Within the range of the above condition with the development of ultra-thinness and wide-angle, it is beneficial to correcting aberration of off-axis angle. Optionally, a following condition is satisfied:

$$-0.31 \le (R13 + R14)/(R13 - R14) \le 0.23.$$

A total optical length from an object-side surface of the first lens to an image plane of the camera optical lens 10 along an optic axis is defined as TTL, and an on-axis thickness of the seventh lens L7 is defined as d13. A following condition is satisfied: 0.05≤d13/TTL≤0.20. Within the range of the above condition, it is beneficial to achieving ultra-thinness. Optionally, a following condition is satisfied: 0.08≤d13/TTL≤0.16.

In this embodiment, the F number of the camera optical lens 10 is defined as FNO. A following condition is satisfied: FNO≤1.75, so that it is beneficial to achieving a large aperture. Optionally, a following condition is satisfied: FNO≤1.72.

In this embodiment, the F number of the camera optical lens 10 is defined as FNO, and a total optical length from an object-side surface of the first lens to an image plane of the camera optical lens 10 along an optic axis is defined as TTL. A following condition is satisfied: TTL/FNO≤5.00, achieving miniaturization and small diameter of front opening.

When the above conditions are satisfied, the camera optical lens 10 has good optical performance such as large aperture, ultra-thinness and wide angle while taking into account characteristics of miniaturization, small chromatic aberration, small lateral color, high resolution up to 5M, and also has a long back focal length for easy assembling and low cost. According to properties of the camera optical lens 10, the camera optical lens 10 is especially suitable for mobile phone camera lens components and WEB camera lens that are composed of high-pixel CCD, CMOS and other imaging elements, respectively.

The camera optical lens 10 of the present disclosure will be described below with examples. The symbols recorded in each example will be described as follows. The focal length, on-axis distance, central curvature radius, on-axis thickness, inflection point, and arrest point are each in unit of millimeter (mm).

TTL denotes a total optical length (on-axis distance from the object-side surface of the first lens L1 to the image plane Si), with a unit of millimeter (mm).

F number FNO denotes a ratio of an effective focal length of the camera optical lens to an entrance pupil diameter.

Optionally, the object-side surface and/or the image-side surface of the lens may be provided with inflection points and/or arrest points in order to meet high-quality imaging requirements. The description below may be referred to in specific embodiments as follows.

Design data of the camera optical lens 10 according to Embodiment 1 of the present disclosure are shown in Tables 1 and 2.

TABLE 1

| | R | d | | nd | | vd |
|---|---|---|---|---|---|---|
| R1 | 58.524 | d1= | 1.000 | nd1 | 1.7684 | v1 | 49.29 |
| R2 | 6.614 | d2= | 1.998 | | | |
| R3 | −13.439 | d3= | 1.611 | nd2 | 1.8100 | v2 | 41.00 |
| R4 | −11.783 | d4= | 0.500 | | | |
| S1 | ∞ | d0= | 0.661 | | | |
| R5 | −7.342 | d5= | 0.806 | nd3 | 1.6204 | v3 | 60.37 |
| R6 | 16.942 | d6= | 0.000 | | | |
| R7 | 16.942 | d7= | 4.500 | nd4 | 1.9537 | v4 | 32.32 |
| R8 | −9.598 | d8= | 0.134 | | | |
| R9 | 17.864 | d9= | 3.288 | nd5 | 1.6921 | v5 | 54.57 |
| R10 | −12.991 | d10= | 0.000 | | | |
| R11 | −12.991 | d11= | 0.806 | nd6 | 1.9229 | v6 | 18.90 |
| R12 | 19.451 | d12= | 0.600 | | | |
| R13 | 12.362 | d13= | 4.000 | nd7 | 1.5891 | v7 | 61.16 |
| R14 | −10.000 | d14= | 0.403 | | | |
| R15 | ∞ | d15= | 0.400 | ndg | 1.5168 | vg | 64.21 |
| R16 | ∞ | d16= | 9.297 | | | |

The reference signs are explained as follows.
S1: aperture;
R: central curvature radius of an optical surface;
R1: central curvature radius of the object-side surface of the first lens L1;
R2: central curvature radius of the image-side surface of the first lens L1;
R3: central curvature radius of the object-side surface of the second lens L2;
R4: central curvature radius of the image-side surface of the second lens L2;
R5: central curvature radius of the object-side surface of the third lens L3;
R6: central curvature radius of the image-side surface of the third lens L3;
R7: central curvature radius of the object-side surface of the fourth lens L4;
R8: central curvature radius of the image-side surface of the fourth lens L4;
R9: central curvature radius of the object-side surface of the fifth lens L5;
R10: central curvature radius of the image-side surface of the fifth lens L5;
R11: central curvature radius of the object-side surface of the sixth lens L6;
R12: central curvature radius of the image-side surface of the sixth lens L6;
R13: central curvature radius of the object-side surface of the seventh lens L7;
R14: central curvature radius of the image-side surface of the seventh lens L7;
R15: central curvature radius of the object-side surface of the optical filter GF;
R16: central curvature radius of the image-side surface of the optical filter GF;
d: on-axis thickness of a lens and an on-axis distance between lenses;
d0: on-axis distance from the aperture S1 to the object-side surface of the third lens L3;
d1: on-axis thickness of the first lens L1;
d2: on-axis distance from the image-side surface of the first lens L1 to the object-side surface of the second lens L2;
d3: on-axis thickness of the second lens L2;
d4: on-axis distance from the image-side surface of the second lens L2 to the aperture S1;
d5: on-axis thickness of the third lens L3;
d6: on-axis distance from the image-side surface of the third lens L3 to the object-side surface of the fourth lens L4;
d7: on-axis thickness of the fourth lens L4;
d8: on-axis distance from the image-side surface of the fourth lens L4 to the object-side surface of the fifth lens L5;
d9: on-axis thickness of the fifth lens L5;
d10: on-axis distance from the image-side surface of the fifth lens L5 to the object-side surface of the sixth lens L6;
d11: on-axis thickness of the sixth lens L6;
d12: on-axis distance from the image-side surface of the sixth lens L6 to the object-side surface of the seventh lens L7;
d13: on-axis thickness of the seventh lens L7;
d14: on-axis distance from the image-side surface of the seventh lens L7 to the object-side surface of the optical filter GF;
d15: on-axis thickness of the optical filter GF;
d16: on-axis distance from the image-side surface of the optical filter GF to the image plane Si;
nd: refractive index of a d-line (the d-line is green light with a wavelength of 555 nm);
nd1: refractive index of the d-line of the first lens L1;
nd2: refractive index of the d-line of the second lens L2;
nd3: refractive index of the d-line of the third lens L3;
nd4: refractive index of the d-line of the fourth lens L4;
nd5: refractive index of the d-line of the fifth lens L5;
nd6: refractive index of the d-line of the sixth lens L6;
nd7: refractive index of the d-line of the seventh lens L7;
ndg: refractive index of the d-line of the optical filter GF;
vd: Abbe number;
v1: Abbe number of the first lens L1;
v2: Abbe number of the second lens L2;
v3: Abbe number of the third lens L3;
v4: Abbe number of the fourth lens L4;
v5: Abbe number of the fifth lens L5;
v6: Abbe number of the sixth lens L6;
v7: Abbe number of the seventh lens L7;
vg: Abbe number of the optical filter GF.

Table 2 shows aspheric surface data of the first lens L1, the second lens L2 and the seventh lens L7 in the camera optical lens 10 according to Embodiment 1 of the present disclosure.

It should be noted that that each lens surface of the third lens L3, the fourth lens L4, the fifth lens L5 and the sixth lens L6 in the camera optical lens 10 in Embodiment 1 is a spherical surface.

TABLE 2

| | Conic coefficient | Aspheric coefficient | | | | |
|---|---|---|---|---|---|---|
| | k | A4 | A6 | A8 | A10 | A12 |
| R1 | 1.2702E+02 | 1.9741E−03 | −1.3814E−04 | 6.1484E−06 | −1.4288E−07 | 9.0215E−10 |
| R2 | 5.4438E−01 | 2.9063E−03 | −6.3457E−05 | −6.4599E−06 | 1.2949E−06 | −2.3331E−08 |
| R3 | 3.3777E+00 | −1.5381E−04 | 4.2920E−06 | −4.6369E−06 | 9.6074E−07 | −4.2277E−08 |
| R4 | −1.2799E−01 | −8.3240E−05 | 9.2990E−06 | −3.2090E−06 | 6.4871E−07 | −3.2714E−08 |
| R13 | −2.4460E+00 | −5.1900E−06 | 1.9260E−07 | 3.5846E−08 | −2.7044E−10 | 6.0425E−12 |
| R14 | −2.1602E+00 | 1.3547E−05 | 9.4447E−09 | 4.9161E−08 | −5.3020E−10 | 1.3417E−11 |

For convenience, the aspheric surfaces of the first lens L1, the second lens L2, and the seventh lens L7 use the aspheric surfaces shown in formula (1) below. However, the present disclosure is not limited to the polynomial form of aspheric surfaces represented by formula (1).

$$z = (cr^2)/\{1 + [1(k+1)(c^2r^2)]^{1/2}\} + A4r^4 + A6r^6 + A8r^8 + A10r^{10} + A12r^{12} \quad (1)$$

Here, k denotes a conic coefficient, and A4, A6, A8, A10, and A12 each denote an aspheric coefficient, respectively, c denotes an curvature at a center of an optical surface, r denotes a vertical distance between a point on a curve of the aspheric surface and the optical axis, and Z denotes an aspheric depth (i.e., a vertical distance between a point of the aspheric surface from which a distance to the optical axis is r, and a tangent plane tangent to a vertex on an aspheric optical axis).

Design data of the inflection point and the arrest point of each lens in the camera optical lens 10 according to Embodiment 1 of the present disclosure are shown in Tables 3 and 4. Here, P1R1 and P1R2 denote the object side surface and image side surface of the first lens L1, respectively. P2R1 and P2R2 denote the object side surface and image side surface of the second lens L2, respectively. P3R1 and P3R2 denote the object side surface and image side surface of the third lens L3, respectively. P4R1 and P4R2 denote the object side surface and image side surface of the fourth lens L4, respectively. P5R1 and P5R2 denote the object side surface and image side surface of the fifth lens L5, respectively. P6R1 and P6R2 denote the object side surface and image side surface of the sixth lens L6, respectively. P7R1 and P7R2 denote the object side surface and image side surface of the seventh lens L7, respectively. Data in an "inflection point" column are a vertical distance from an inflexion point provided on a surface of each lens to the optical axis of the camera optical lens 10. Data in an "arrest point" column are a vertical distance from an arrest point provided on the surface of each lens to the optical axis of the camera optical lens 10.

TABLE 3

| | Number of inflection points | Inflection point 1 |
|---|---|---|
| P1R1 | 0 | / |
| P1R2 | 0 | / |
| P2R1 | 0 | / |
| P2R2 | 0 | / |
| P3R1 | 0 | / |
| P3R2 | 0 | / |
| P4R1 | 0 | / |
| P4R2 | 0 | / |

TABLE 3-continued

| | Number of inflection points | Inflection point 1 |
|---|---|---|
| P5R1 | 0 | / |
| P5R2 | 0 | / |
| P6R1 | 0 | / |
| P6R2 | 0 | / |
| P7R1 | 0 | / |
| P7R2 | 1 | 5.285 |

TABLE 4

| | Number of arrest points | Arrest point1 |
|---|---|---|
| P1R1 | 0 | / |
| P1R2 | 0 | / |
| P2R1 | 0 | / |
| P2R2 | 0 | / |
| P3R1 | 0 | / |
| P3R2 | 0 | / |
| P4R1 | 0 | / |
| P4R2 | 0 | / |
| P5R1 | 0 | / |
| P5R2 | 0 | / |
| P6R1 | 0 | / |
| P6R2 | 0 | / |
| P7R1 | 0 | / |
| P7R2 | 0 | / |

Figure 2:
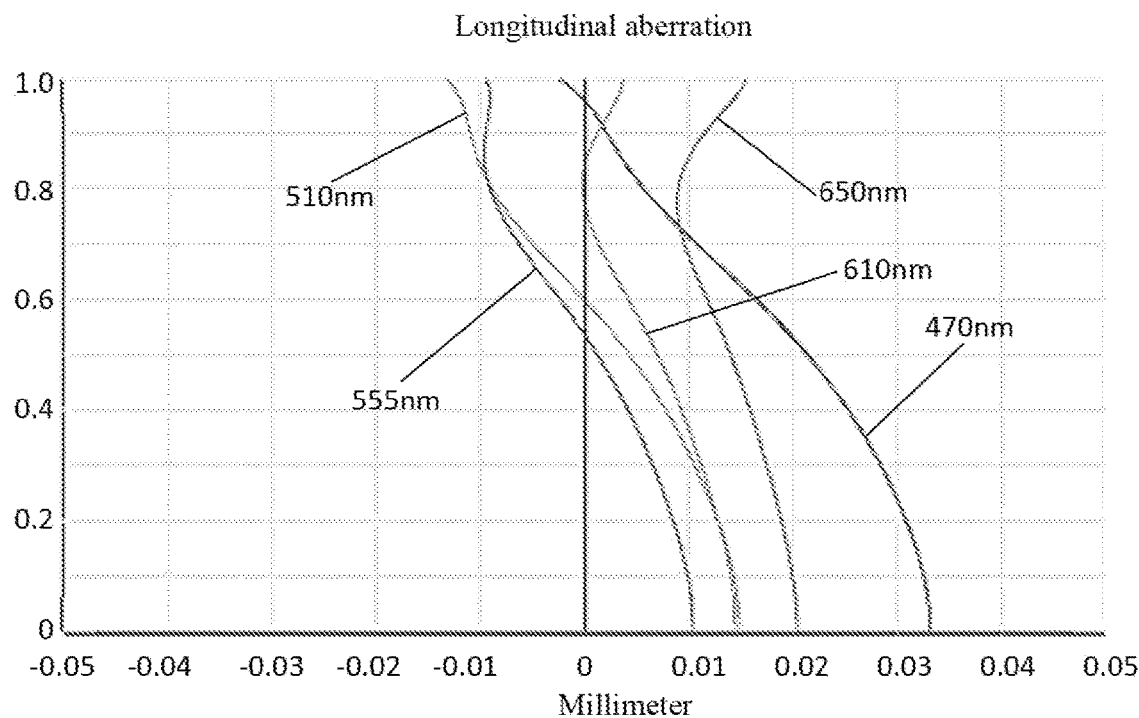
FIG. 2 is a schematic diagram of a longitudinal aberration of the camera optical lens shown in FIG. 1.
Figure 3:
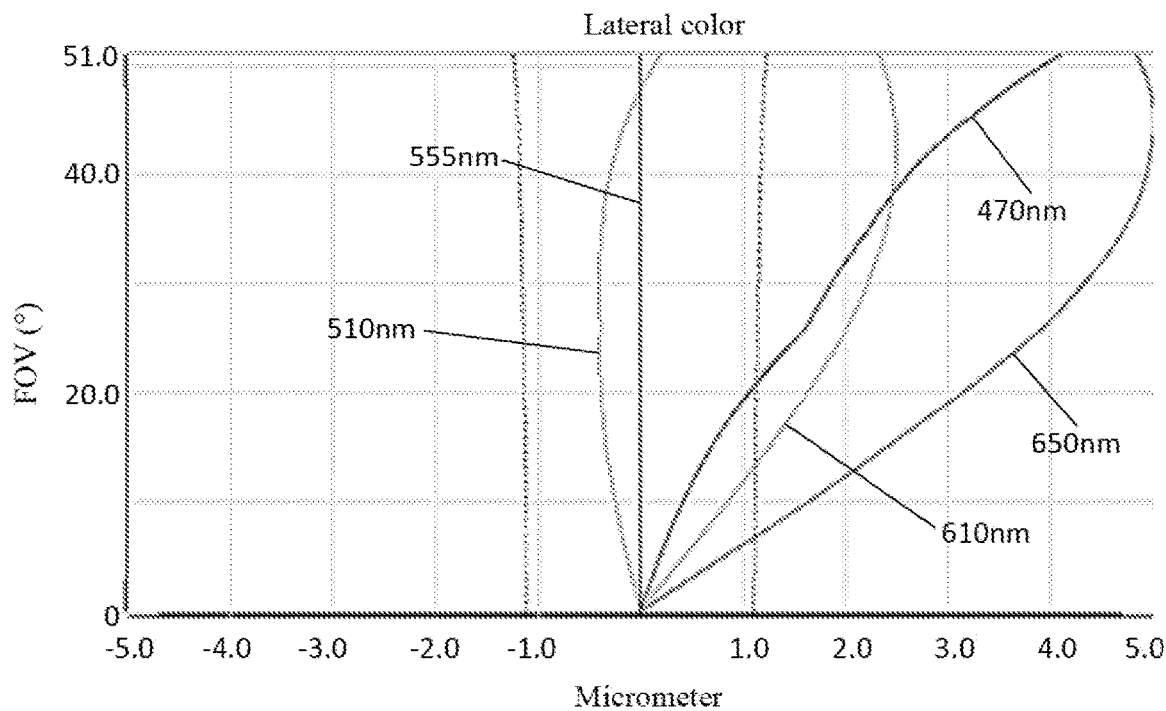
FIG. 3 is a schematic diagram of a lateral color of the camera optical lens shown in FIG. 1.
Figure 4:
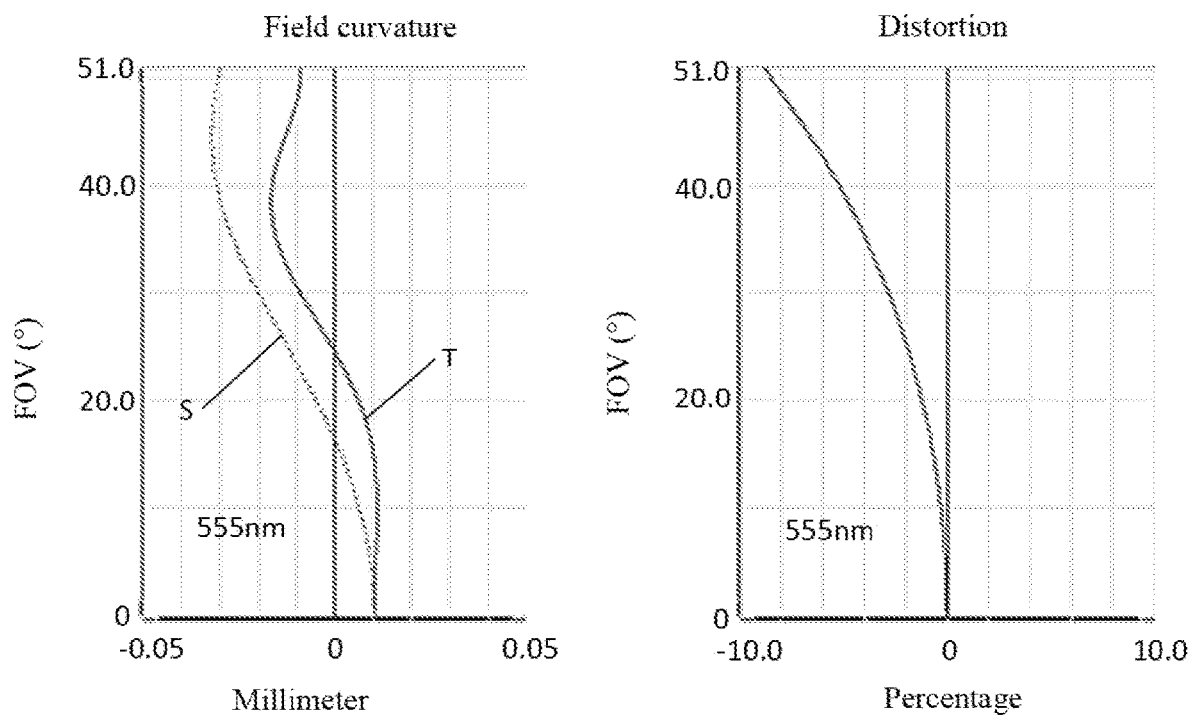
FIG. 4 is a schematic diagram of a field curvature and a distortion of the camera optical lens shown in FIG. 1.

FIG. 2 and FIG. 3 are schematic diagrams of a longitudinal aberration and a lateral color of the camera optical lens 10 after light having a wavelength of 650 nm, 610 nm, 555 nm, 510 nm and 470 nm passes through the camera optical lens 10 according to Embodiment 1, respectively. FIG. 4 is a schematic diagram of a field curvature and a distortion of the camera optical lens 10 after light having a wavelength of 555 nm passes through the camera optical lens 10 according to Embodiment 1. A field curvature S in FIG. 4 is a field curvature in a sagittal direction, and T is a field curvature in a meridian direction.

Table 29 below shows numerical values corresponding to various numerical values in Embodiments 1, 2, 3, 4 and 5, and parameters specified in the conditions. As shown in Table 29, Embodiment 1 satisfies various conditions.

In this embodiment, the camera optical lens 10 has an entrance pupil diameter ENPD of 3.950 mm, a full-field image height IH of 5.145 mm, and a field of view FOV of 102.40° in a diagonal direction. The camera optical lens 10 has good optical performance such as large aperture, ultra-thinness and wide angle while taking into account characteristics of miniaturization, small chromatic aberration, small lateral color, high resolution up to 5M, and also has a long back focal length for easy assembling and low cost.

Embodiment 2

Figure 5:
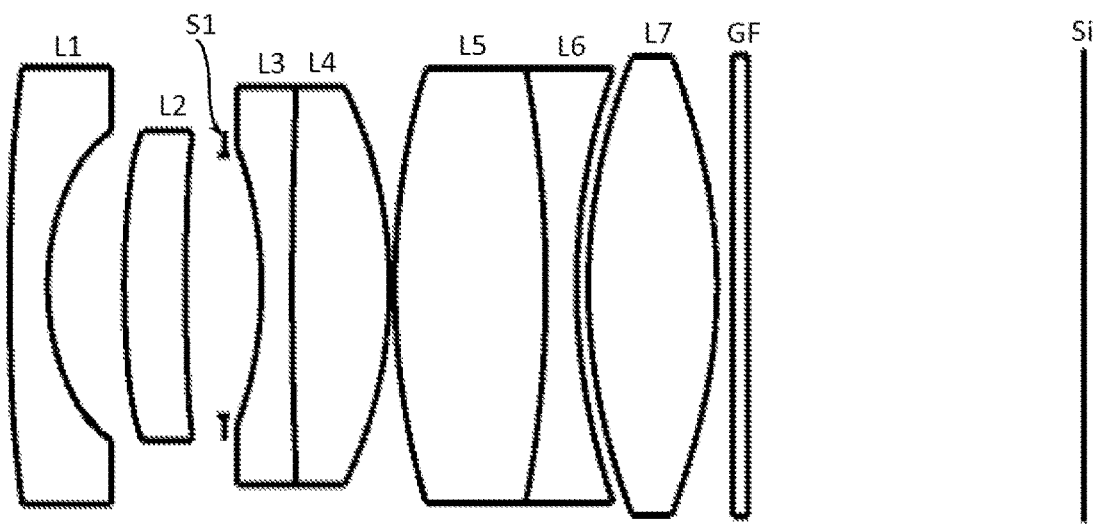
FIG. 5 is a structural schematic diagram of a camera optical lens according to Embodiment 2 of the present disclosure.

FIG. 5 is a structural schematic diagram of a camera optical lens 20 according to Embodiment 2 of the present disclosure. Embodiment 2 is basically the same as Embodiment 1, and involves symbols having the same meanings as Embodiment 1, and only differences therebetween are listed below.

In this embodiment, the object-side surface of the second lens L2 is convex in the paraxial region, and the image-side surface of the second lens L2 is concave in the paraxial region.

Table 5 and Table 6 show the design data of the camera optical lens 20 of the Embodiment 2 of the present disclosure.

TABLE 5

|  | R | d |  | nd |  | vd |
|---|---|---|---|---|---|---|
| R1 | 50.000 | d1= | 1.000 | nd1 | 1.7725 | v1 | 49.61 |
| R2 | 4.953 | d2= | 2.000 |
| R3 | 17.259 | d3= | 1.611 | nd2 | 1.7433 | v2 | 49.40 |
| R4 | 50.000 | d4= | 1.000 |
| S1 | ∞ | d0= | 1.000 |
| R5 | −7.519 | d5= | 0.806 | nd3 | 1.5174 | v3 | 52.19 |
| R6 | 78.254 | d6= | 0.000 |
| R7 | 78.254 | d7= | 2.551 | nd4 | 1.9537 | v4 | 32.32 |
| R8 | −8.504 | d8= | 0.133 |
| R9 | 14.042 | d9= | 3.974 | nd5 | 1.6921 | v5 | 54.57 |
| R10 | −21.404 | d10= | 0.000 |
| R11 | −21.404 | d11= | 0.806 | nd6 | 1.9229 | v6 | 18.90 |
| R12 | 12.093 | d12= | 0.300 |
| R13 | 10.516 | d13= | 3.370 | nd7 | 1.6180 | v7 | 63.41 |
| R14 | −9.803 | d14= | 0.403 |
| R15 | ∞ | d15= | 0.400 | ndg | 1.5168 | vg | 64.21 |
| R16 | ∞ | d16= | 8.826 |

Table 6 shows aspheric surface data of the first lens L1, the second lens L2 and the seventh lens L7 in the camera optical lens 20 according to Embodiment 2 of the present disclosure.

TABLE 6

| | Conic coefficient | Aspheric coefficient | | | | |
|---|---|---|---|---|---|---|
| | k | A4 | A6 | A8 | A10 | A12 |
| R1 | 7.3818E+01 | 1.5470E−04 | 2.3928E−06 | −9.0391E−08 | −6.0759E−09 | −5.6886E−11 |
| R2 | 2.7310E−01 | 3.5301E−04 | 4.9216E−05 | 1.1979E−06 | 1.5973E−07 | 4.0319E−08 |
| R3 | −4.1838E+00 | 1.3787E−04 | 2.0759E−05 | 3.0865E−06 | 2.4227E−07 | 6.6851E−09 |
| R4 | 6.4431E+01 | 4.9935E−05 | 1.3584E−05 | 1.3183E−06 | 1.2994E−07 | 1.0727E−08 |
| R13 | −2.1026E+00 | −2.8727E−06 | 4.9172E−07 | 2.7468E−08 | 1.3838E−09 | 3.1063E−11 |
| R14 | −1.9136E+00 | −9.6042E−06 | −1.5748E−07 | 8.6307E−09 | 9.6703E−10 | 9.0303E−11 |

Design data of the inflection point and the arrest point of each lens in the camera optical lens 20 according to Embodiment 2 of the present disclosure are shown in Tables 7 and 8.

TABLE 7

| | Number of inflection points | Inflection point 1 |
|---|---|---|
| P1R1 | 1 | 4.425 |
| P1R2 | 0 | / |
| P2R1 | 0 | / |
| P2R2 | 0 | / |
| P3R1 | 0 | / |
| P3R2 | 0 | / |
| P4R1 | 0 | / |
| P4R2 | 0 | / |
| P5R1 | 0 | / |
| P5R2 | 0 | / |
| P6R1 | 0 | / |
| P6R2 | 0 | / |

TABLE 7-continued

| | Number of inflection points | Inflection point 1 |
|---|---|---|
| P7R1 | 0 | / |
| P7R2 | 1 | 4.665 |

TABLE 8

| | Number of arrest points | Arrest point1 |
|---|---|---|
| P1R1 | 0 | / |
| P1R2 | 0 | / |
| P2R1 | 0 | / |
| P2R2 | 0 | / |
| P3R1 | 0 | / |
| P3R2 | 0 | / |
| P4R1 | 0 | / |
| P4R2 | 0 | / |
| P5R1 | 0 | / |
| P5R2 | 0 | / |
| P6R1 | 0 | / |
| P6R2 | 0 | / |
| P7R1 | 0 | / |
| P7R2 | 0 | / |

Figure 6:
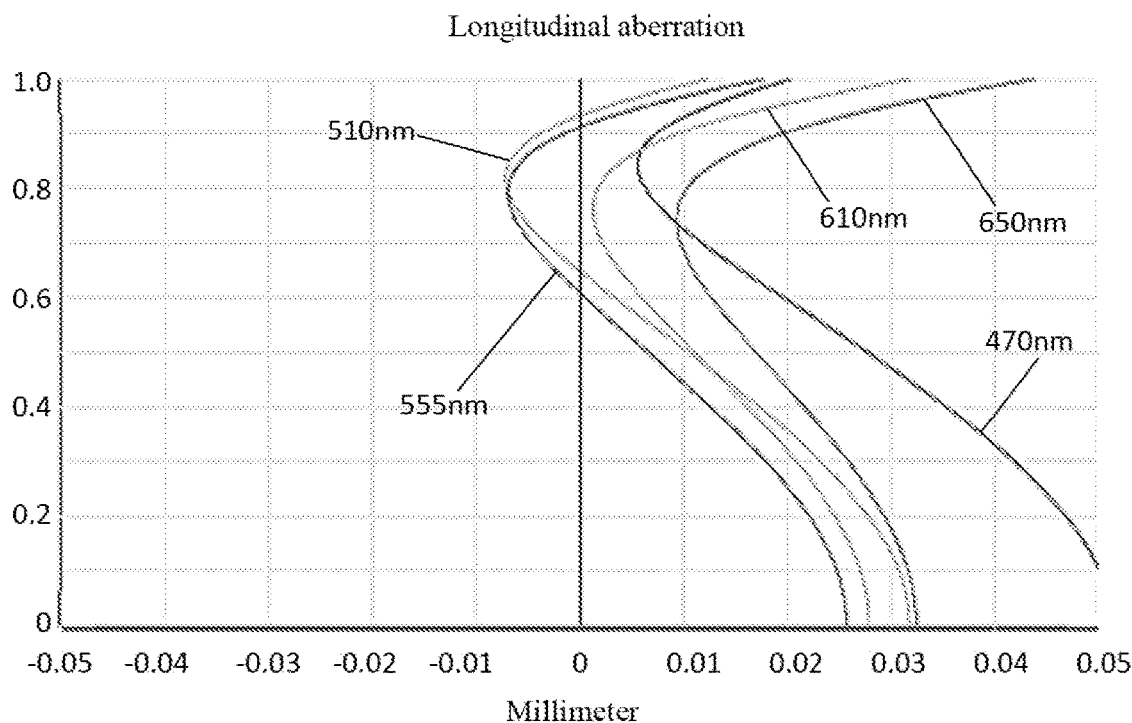
FIG. 6 is a schematic diagram of a longitudinal aberration of the camera optical lens shown in FIG. 5.
Figure 7:
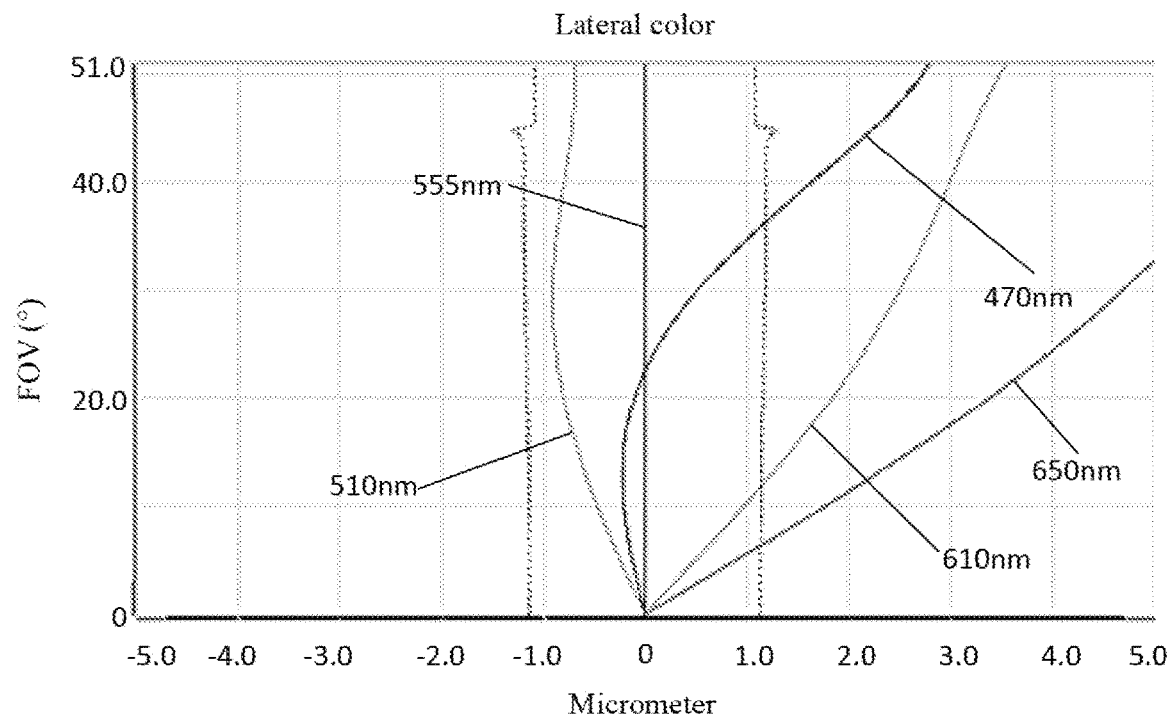
FIG. 7 is a schematic diagram of a lateral color of the camera optical lens shown in FIG. 5.
Figure 8:
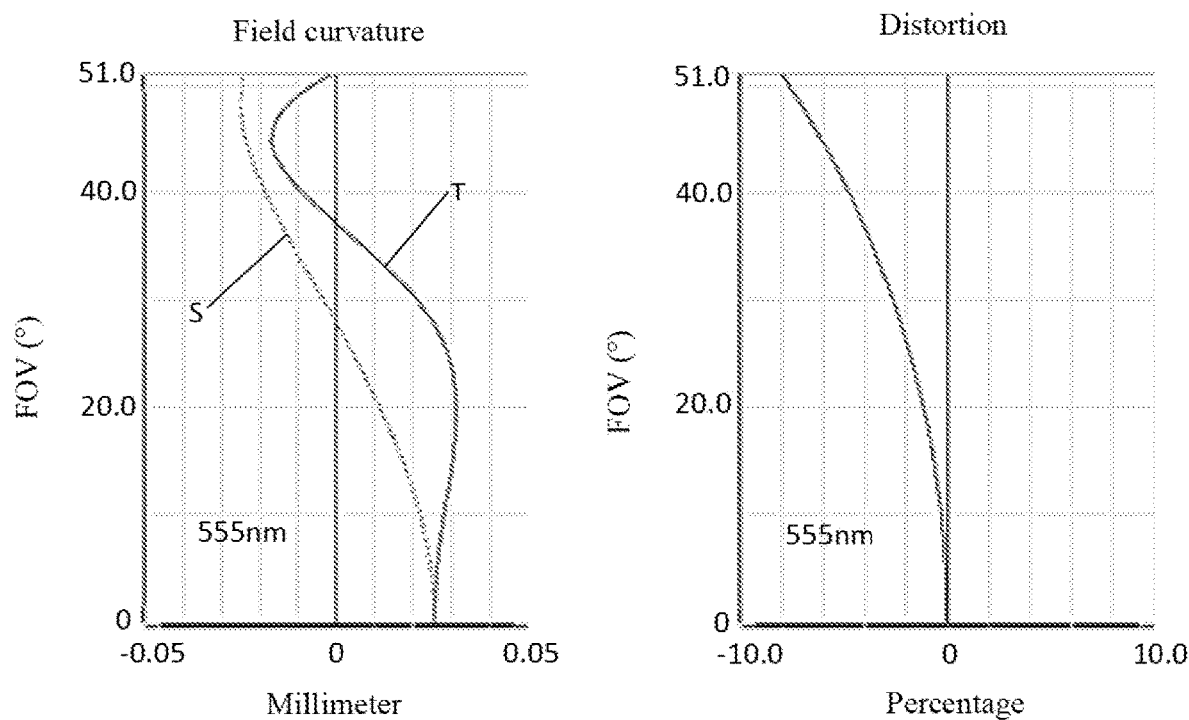
FIG. 8 is a schematic diagram of a field curvature and a distortion of the camera optical lens shown in FIG. 5.

FIG. 6 and FIG. 7 are schematic diagrams of a longitudinal aberration and a lateral color of the camera optical lens 20 after light having a wavelength of 650 nm, 610 nm, 555 nm, 510 nm and 470 nm passes through the camera optical lens 20 according to Embodiment 2, respectively. FIG. 8 is a schematic diagram of a field curvature and a distortion after light having a wavelength of 555 nm passes through the camera optical lens 20 according to Embodiment 2. The field curvature S in FIG. 8 is a field curvature in a sagittal direction, and T is a field curvature in a meridional direction.

As shown in Table 29, Embodiment 2 satisfies various conditions.

In this embodiment, the camera optical lens 20 has an entrance pupil diameter ENPD of 3.930 mm, a full-field image height IH of 5.145 mm, and a field of view FOV 102.10° in a diagonal direction. The camera optical lens 20 has good optical performance such as large aperture, ultra-thinness and wide angle while taking into account characteristics of miniaturization, small chromatic aberration, small lateral color, high resolution up to 5M, and also has a long back focal length for easy assembling and low cost.

Embodiment 3

Figure 9:
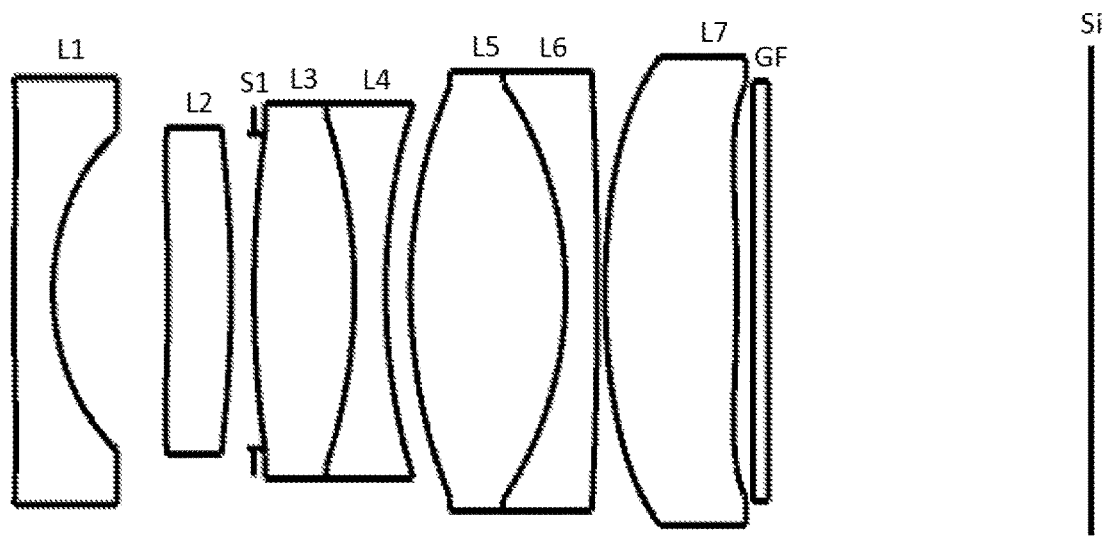
FIG. 9 is a structural schematic diagram of a camera optical lens according to Embodiment 3 of the present disclosure.

FIG. 9 is a structural schematic diagram of a camera optical lens 30 according to Embodiment 3 of the present disclosure. Embodiment 3 is basically the same as Embodiment 1, and involves symbols having the same meanings as Embodiment 1, and only differences therebetween are listed below.

In this embodiment, the object-side surface of the third lens L3 is convex in the paraxial region, and the image-side surface of the third lens L3 is convex in the paraxial region. The object-side surface of the fourth lens L4 is concave in the paraxial region, and the image-side surface of the fourth lens L4 is concave in the paraxial region. The image-side surface of the sixth lens L6 is convex in the paraxial region. The third lens L3 has a positive refractive power, and the fourth lens L4 has a negative refractive power.

Design data of the camera optical lens 30 of Embodiment 3 of the present disclosure are shown in Tables 9 and 10.

TABLE 9

|  | R | d | nd |  | vd |
|---|---|---|---|---|---|
| R1 | 50.000 | d1= 1.000 | nd1 | 1.7740 v1 | 49.60 |
| R2 | 4.456 | d2= 2.940 | | | |
| R3 | −30.000 | d3= 1.611 | nd2 | 1.8100 v2 | 41.00 |
| R4 | −21.000 | d4= 0.600 | | | |
| S1 | ∞ | d0= 0.000 | | | |
| R5 | 21.146 | d5= 2.551 | nd3 | 1.9537 v3 | 32.32 |
| R6 | −10.070 | d6= 0.000 | | | |
| R7 | −10.070 | d7= 0.800 | nd4 | 1.5174 v4 | 52.19 |
| R8 | 11.606 | d8= 0.633 | | | |
| R9 | 10.107 | d9= 3.974 | nd5 | 1.6921 v5 | 54.57 |
| R10 | −6.878 | d10= 0.000 | | | |
| R11 | −6.878 | d11= 0.806 | nd6 | 1.9229 v6 | 18.90 |
| R12 | −77.195 | d12= 0.205 | | | |
| R13 | 14.278 | d13= 3.359 | nd7 | 1.7433 v7 | 49.34 |
| R14 | −23.865 | d14= 0.403 | | | |
| R15 | ∞ | d15= 0.400 | ndg | 1.5168 vg | 64.21 |
| R16 | ∞ | d16= 8.248 | | | |

Table 10 shows aspheric surface data of the first lens L1, the second lens L2 and the seventh lens L7 in the camera optical lens 30 of the Embodiment 3 of the present disclosure.

TABLE 10

| | Conic coefficient | Aspheric coefficient | | | | |
|---|---|---|---|---|---|---|
| | k | A4 | A6 | A8 | A10 | A12 |
| R1 | 1.0563E+02 | −3.6645E−04 | −3.2648E−05 | 9.9226E−07 | 2.0032E−08 | −1.3970E−09 |
| R2 | 5.7717E−02 | 6.9303E−04 | −5.4109E−05 | −7.7723E−08 | 1.2845E−07 | 1.3919E−09 |
| R3 | −8.3399E+01 | 7.2850E−04 | −9.8556E−06 | 1.2989E−06 | 7.2341E−08 | 1.9118E−09 |
| R4 | −1.4483E+01 | 1.5478E−04 | −1.0031E−05 | −8.0541E−07 | 1.1500E−07 | −2.0905E−10 |
| R13 | 3.8745E+00 | 2.3772E−04 | 2.6665E−05 | −1.6177E−06 | 5.9282E−08 | −7.5860E−10 |
| R14 | −1.1735E+01 | 9.9744E−04 | 1.0816E−05 | 1.7072E−06 | −8.8881E−08 | 2.6969E−09 |

Design data of the inflection point and the arrest point of each lens in the camera optical lens 30 according to Embodiment 3 of the present disclosure are shown in Tables 11 and 12.

TABLE 11

| | Number of inflection points | Inflection point 1 | Inflection point 2 |
|---|---|---|---|
| P1R1 | 2 | 1.905 | 4.455 |
| P1R2 | 0 | / | / |
| P2R1 | 1 | 1.665 | / |
| P2R2 | 1 | 3.075 | / |
| P3R1 | 0 | / | / |
| P3R2 | 0 | / | / |
| P4R1 | 0 | / | / |
| P4R2 | 0 | / | / |
| P5R1 | 0 | / | / |
| P5R2 | 0 | / | / |
| P6R1 | 0 | / | / |
| P6R2 | 0 | / | / |

TABLE 11-continued

| | Number of inflection points | Inflection point 1 | Inflection point 2 |
|---|---|---|---|
| P7R1 | 0 | / | / |
| P7R2 | 1 | 1.695 | / |

TABLE 12

| | Number of arrest points | Arrest point1 |
|---|---|---|
| P1R1 | 1 | 3.195 |
| P1R2 | 0 | / |
| P2R1 | 1 | 2.735 |
| P2R2 | 0 | / |
| P3R1 | 0 | / |
| P3R2 | 0 | / |
| P4R1 | 0 | / |
| P4R2 | 0 | / |
| P5R1 | 0 | / |
| P5R2 | 0 | / |
| P6R1 | 0 | / |
| P6R2 | 0 | / |
| P7R1 | 0 | / |
| P7R2 | 1 | 2.795 |

Figure 10:
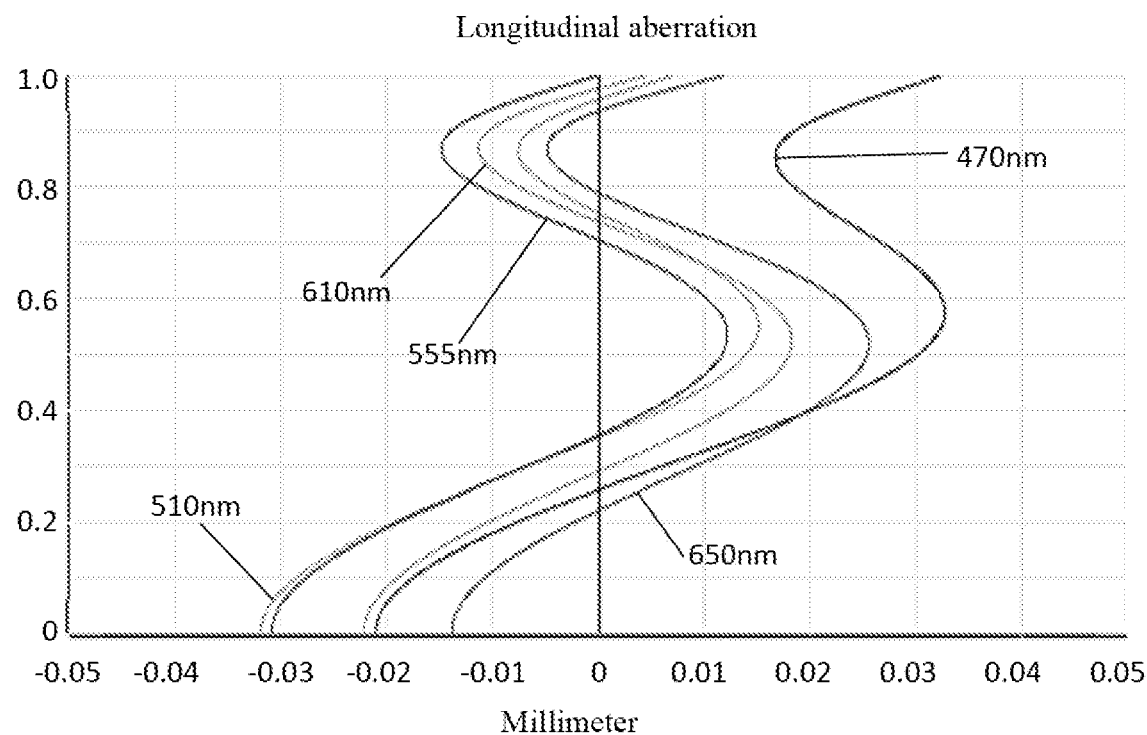
FIG. 10 is a schematic diagram of a longitudinal aberration of the camera optical lens shown in FIG. 9.
Figure 11:
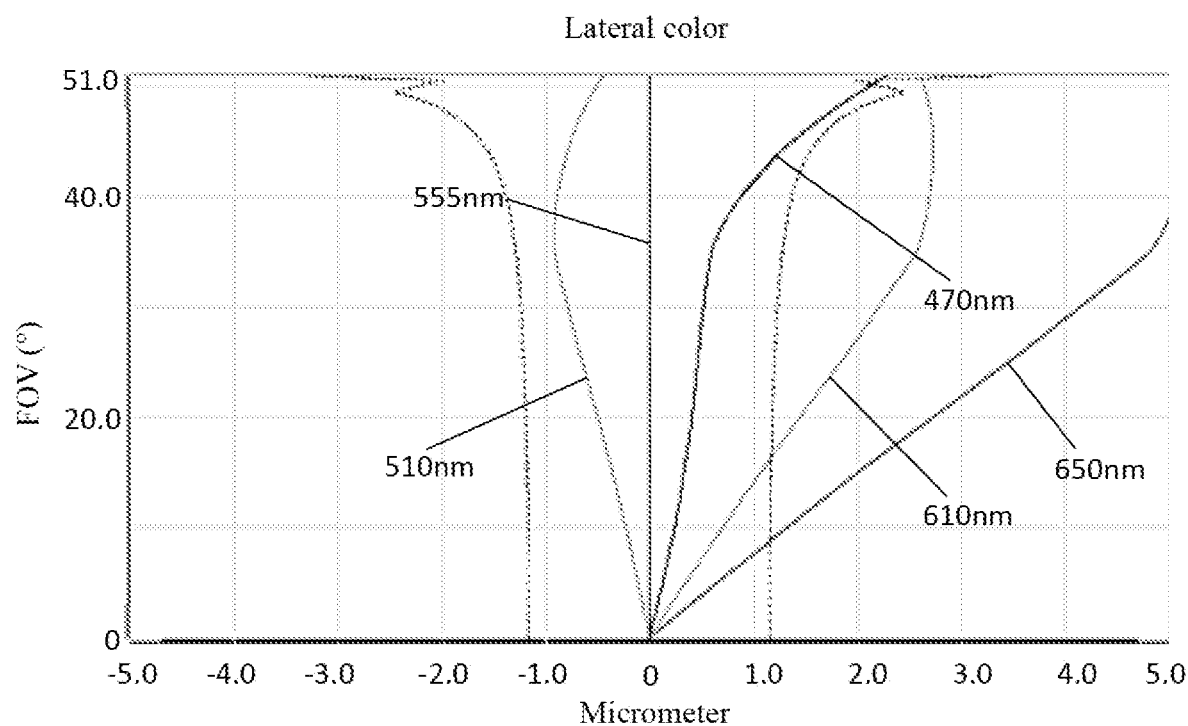
FIG. 11 is a schematic diagram of a lateral color of the camera optical lens shown in FIG. 9.
Figure 12:
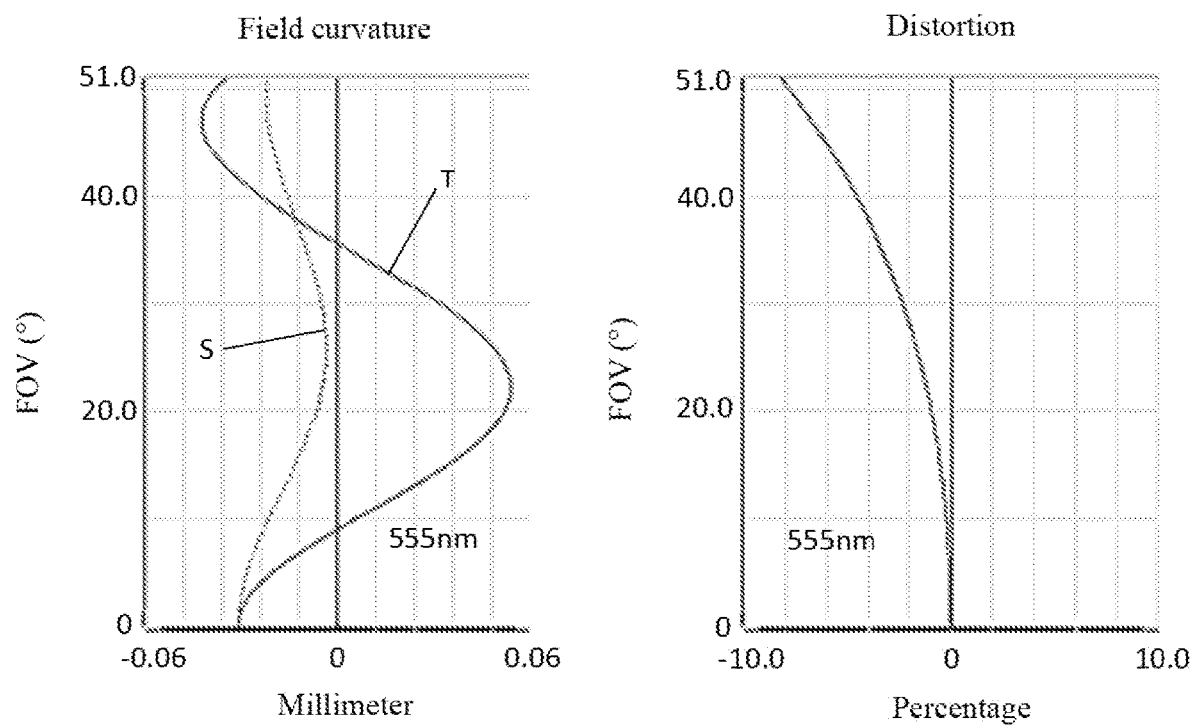
FIG. 12 is a schematic diagram of a field curvature and a distortion of the camera optical lens shown in FIG. 9.

FIG. 10 and FIG. 11 are schematic diagrams of a longitudinal aberration and a lateral color of the camera optical lens 30 after light having a wavelength of 650 nm, 610 nm, 555 nm, 510 nm and 470 nm passes through the camera optical lens 30 according to Embodiment 3, respectively. FIG. 12 is a schematic diagram of a field curvature and a distortion after light having a wavelength of 555 nm passes through the camera optical lens 30 according to Embodiment 3. The field curvature S in FIG. 12 is a field curvature in a sagittal direction, and T is a field curvature in a meridional direction.

Table 29 below lists the corresponding values of each condition in this embodiment according to the above conditions. It can be appreciated that the camera optical lens 30 of this embodiment satisfies the above conditions.

In this embodiment, the camera optical lens 30 has an entrance pupil diameter ENPD of 3.915 mm, a full-field image height IH of 5.145 mm, and a field of view FOV of 102.60° in a diagonal direction. The camera optical lens 30 has good optical performance such as large aperture, ultra-thinness and wide angle while taking into account characteristics of miniaturization, small chromatic aberration, small lateral color, high resolution up to 5M, and also has a long back focal length for easy assembling and low cost.

Embodiment 4

Figure 13:
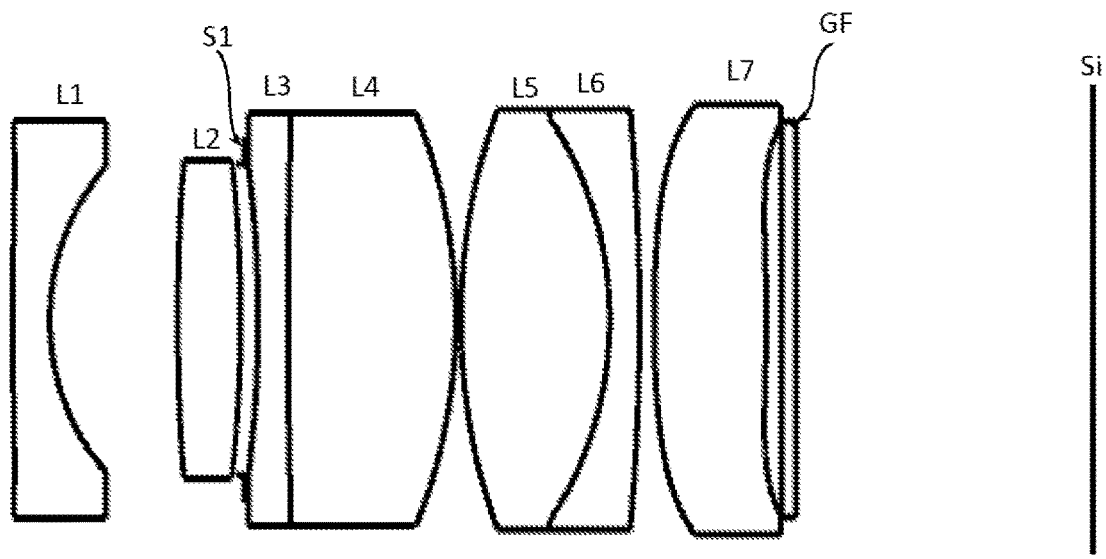
FIG. 13 is a structural schematic diagram of a camera optical lens according to Embodiment 4 of the present disclosure.

FIG. 13 is a structural schematic diagram of a camera optical lens 40 according to Embodiment 4 of the present disclosure. Embodiment 4 is basically the same as Embodiment 1, and involves symbols having the same meanings as Embodiment 1, and only differences therebetween are listed below.

In this embodiment, the object-side surface of the second lens L3 is convex in the paraxial region, and the image-side surface of the sixth lens L6 is convex in the paraxial region.

Design data of the camera optical lens 40 of Embodiment 4 of the present disclosure are shown in Tables 13 and 14.

TABLE 13

| | R | d | | nd | | vd |
|---|---|---|---|---|---|---|
| R1 | 68.688 | d1= | 1.000 | nd1 | 1.8839 v1 | 37.21 |
| R2 | 4.605 | d2= | 3.426 | | | |
| R3 | 50.000 | d3= | 1.700 | nd2 | 1.8839 v2 | 37.21 |
| R4 | −24.531 | d4= | 0.100 | | | |
| S1 | ∞ | d0= | 0.367 | | | |
| R5 | −22.927 | d5= | 0.806 | nd3 | 1.6204 v3 | 60.37 |
| R6 | 120.000 | d6= | 0.000 | | | |
| R7 | 120.000 | d7= | 4.500 | nd4 | 1.9537 v4 | 32.32 |
| R8 | −10.132 | d8= | 0.134 | | | |
| R9 | 11.358 | d9= | 4.000 | nd5 | 1.4970 v5 | 81.59 |
| R10 | −6.931 | d10= | 0.000 | | | |
| R11 | −6.931 | d11= | 0.806 | nd6 | 1.9229 v6 | 18.90 |
| R12 | −42.255 | d12= | 0.400 | | | |
| R13 | 28.200 | d13= | 3.000 | nd7 | 1.5891 v7 | 61.16 |
| R14 | −29.094 | d14= | 0.403 | | | |
| R15 | ∞ | d15= | 0.400 | ndg | 1.5168 vg | 64.21 |
| R16 | ∞ | d16= | 7.974 | | | |

Table 14 shows aspheric surface data of the first lens L1, the second lens L2 and the seventh lens L7 in the camera optical lens 40 according to Embodiment 4 of the present disclosure.

TABLE 14

| | Conic coefficient | Aspheric coefficient | | | | |
|---|---|---|---|---|---|---|
| | k | A4 | A6 | A8 | A10 | A12 |
| R1 | 1.2702E+02 | 2.2951E−04 | −9.6203E−05 | 6.0729E−06 | −1.8605E−07 | 2.2807E−09 |
| R2 | 1.8838E−01 | 1.0818E−03 | −1.3415E−04 | −8.9339E−07 | 5.9204E−07 | −3.1622E−08 |
| R3 | 1.5889E+02 | 3.3344E−04 | −2.4609E−05 | −8.4717E−07 | 1.3422E−07 | −5.8371E−09 |
| R4 | −2.2815E+00 | 1.2354E−04 | −1.1096E−05 | −6.8666E−07 | 6.5065E−08 | −7.6475E−10 |
| R13 | 2.4141E+01 | 9.4874E−04 | 8.4097E−06 | −2.2454E−07 | 8.9037E−09 | −4.4577E−11 |
| R14 | −1.3706E+02 | 8.2668E−04 | 4.3843E−05 | 4.9173E−07 | −7.7032E−08 | 3.5685E−09 |

Design data of the inflection point and the arrest point of each lens in the camera optical lens 40 according to Embodiment 4 of the present disclosure are shown in Tables 15 and 16.

TABLE 15

| | Number of inflection points | Inflection point 1 |
|---|---|---|
| P1R1 | 1 | 2.005 |
| P1R2 | 0 | / |
| P2R1 | 0 | / |
| P2R2 | 0 | / |
| P3R1 | 0 | / |
| P3R2 | 0 | / |
| P4R1 | 0 | / |
| P4R2 | 0 | / |
| P5R1 | 0 | / |
| P5R2 | 0 | / |
| P6R1 | 0 | / |
| P6R2 | 0 | / |
| P7R1 | 0 | / |
| P7R2 | 1 | 1.375 |

TABLE 16

| | Number of arrest points | Arrest point1 |
|---|---|---|
| P1R1 | 1 | 3.265 |
| P1R2 | 0 | / |
| P2R1 | 0 | / |
| P2R2 | 0 | / |
| P3R1 | 0 | / |
| P3R2 | 0 | / |
| P4R1 | 0 | / |
| P4R2 | 0 | / |
| P5R1 | 0 | / |
| P5R2 | 0 | / |
| P6R1 | 0 | / |
| P6R2 | 0 | / |
| P7R1 | 0 | / |
| P7R2 | 1 | 2.305 |

Figure 14:
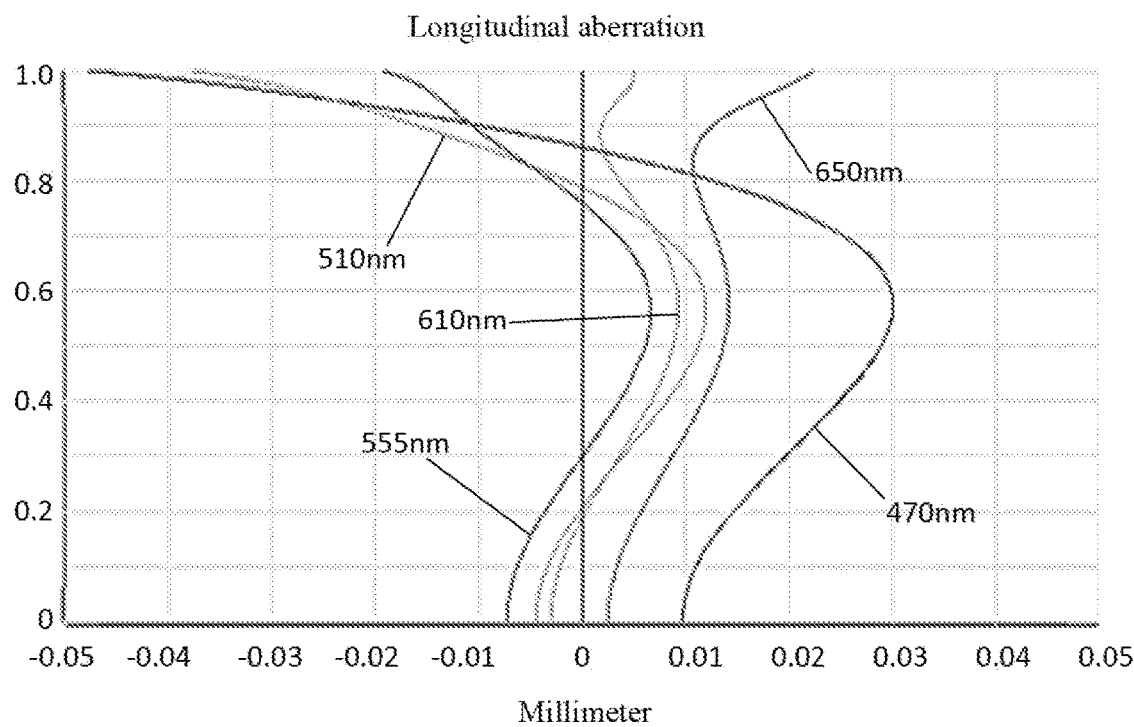
FIG. 14 is a schematic diagram of a longitudinal aberration of the camera optical lens shown in FIG. 13.
Figure 15:
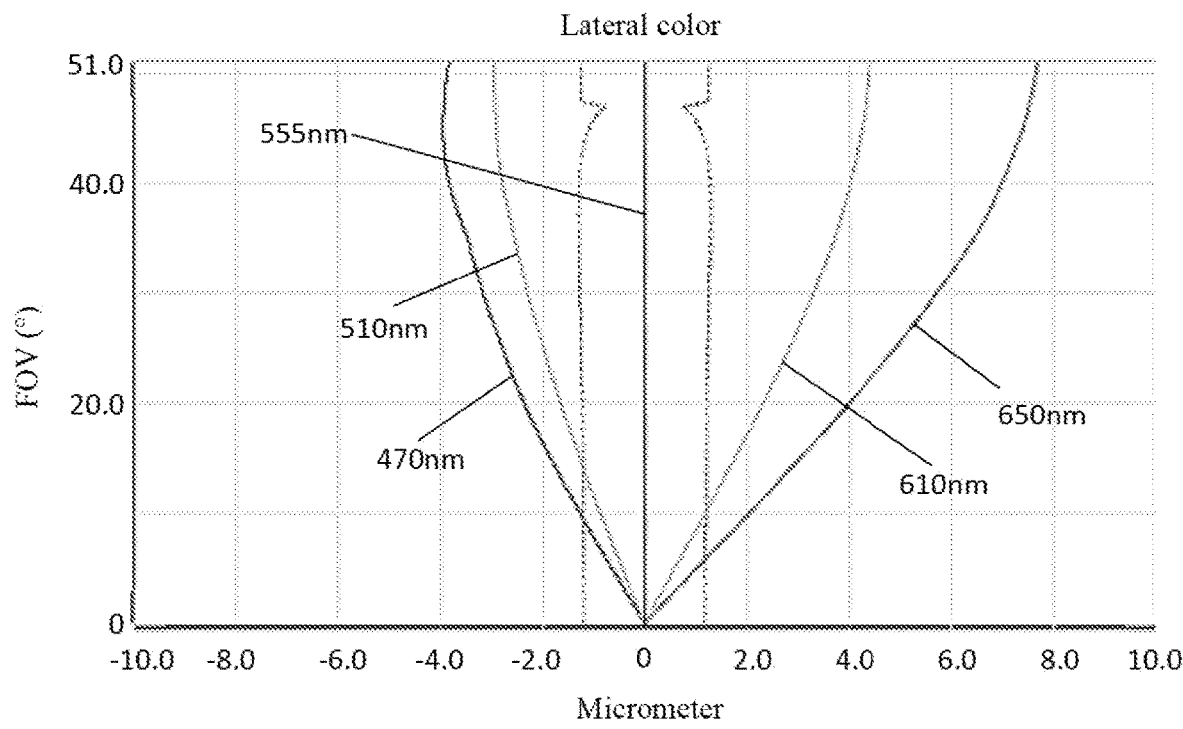
FIG. 15 is a schematic diagram of a lateral color of the camera optical lens shown in FIG. 13.
Figure 16:
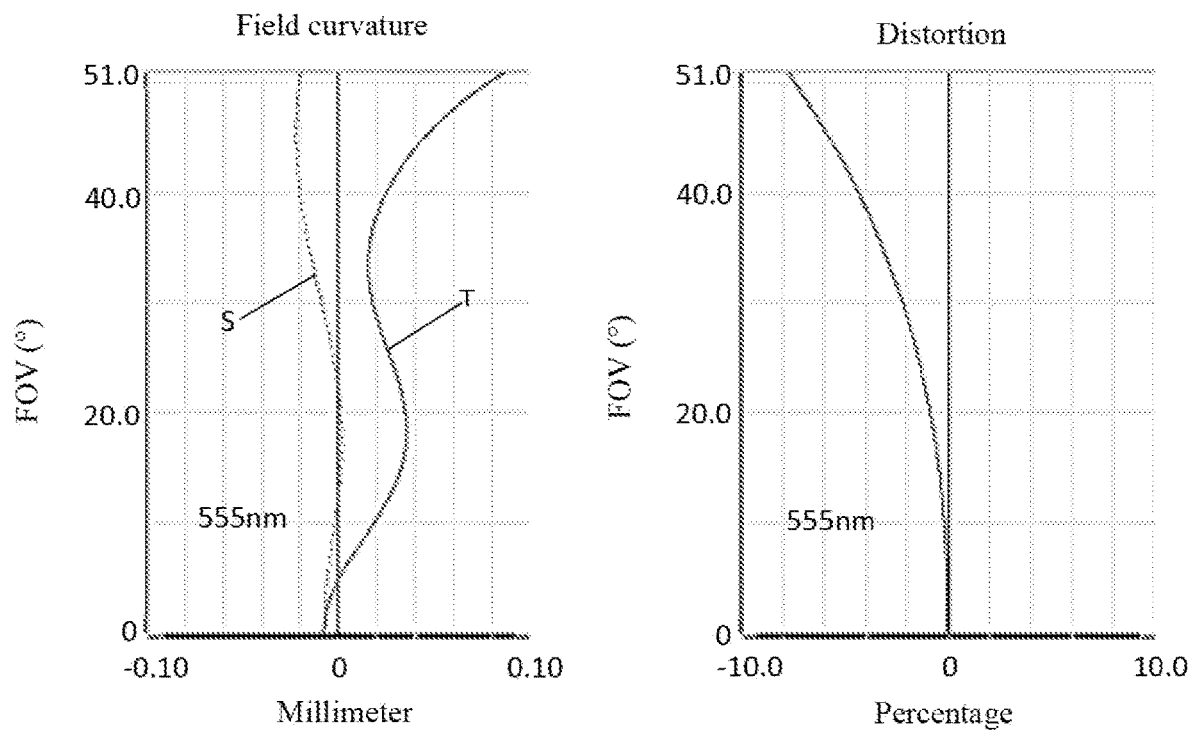
FIG. 16 is a schematic diagram of a field curvature and a distortion of the camera optical lens shown in FIG. 13.

FIG. 14 and FIG. 15 are schematic diagrams of a longitudinal aberration and a lateral color of the camera optical lens 40 after light having a wavelength of 650 nm, 610 nm, 555 nm, 510 nm and 470 nm passes through the camera optical lens 40 according to Embodiment 4, respectively. FIG. 16 is a schematic diagram of a field curvature and a distortion of the camera optical lens 40 after light having a wavelength of 555 nm passes through the camera optical lens 40 according to Embodiment 4. A field curvature S in FIG. 16 is a field curvature in a sagittal direction, and T is a field curvature in a meridian direction.

Table 29 below lists the corresponding values of each condition in this embodiment according to the above conditions. It can be appreciated that the camera optical lens 40 of this embodiment satisfies the above conditions.

In this embodiment, the camera optical lens 40 has an entrance pupil diameter ENPD of 3.911 mm, a full-field image height IH of 5.145 mm, and a field of view FOV 102.20° in a diagonal direction. The camera optical lens 40 has good optical performance such as large aperture, ultra-thinness and wide angle while taking into account characteristics of miniaturization, small chromatic aberration, small lateral color, high resolution up to 5M, and also has a long back focal length for easy assembling and low cost.

Embodiment 5

Figure 17:
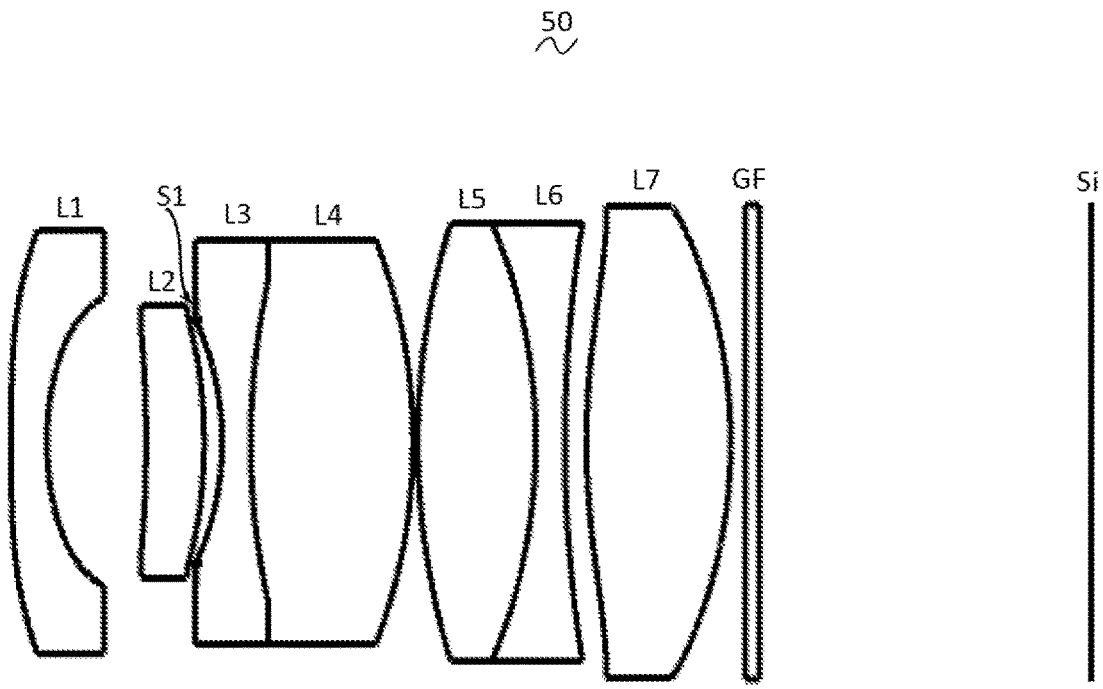
FIG. 17 is a structural schematic diagram of a camera optical lens according to Embodiment 5 of the present disclosure.

FIG. 17 is a structural schematic diagram of a camera optical lens 50 according to Embodiment 5 of the present disclosure. Embodiment 5 is basically the same as Embodiment 1, and involves symbols having the same meanings as Embodiment 1, and only differences therebetween are listed below.

In this embodiment, the second lens L2 has a negative refractive power.

Table 17 and Table 18 show the design data of the camera optical lens 50 of the Embodiment 5 of the present disclosure.

TABLE 17

| | R | d | nd | | vd | |
|---|---|---|---|---|---|---|
| R1 | 58.524 | d1= 1.000 | nd1 | 1.8100 | v1 | 41.00 |
| R2 | 6.394 | d2= 2.739 | | | | |
| R3 | −26.960 | d3= 1.611 | nd2 | 1.8100 | v2 | 41.00 |
| R4 | −10.562 | d4= −0.200 | | | | |
| S1 | ∞ | d0= 0.704 | | | | |
| R5 | −5.787 | d5= 0.806 | nd3 | 1.6204 | v3 | 60.37 |
| R6 | 14.553 | d6= 0.000 | | | | |
| R7 | 14.553 | d7= 4.500 | nd4 | 1.9537 | v4 | 32.32 |
| R8 | −11.272 | d8= 0.134 | | | | |
| R9 | 14.627 | d9= 3.288 | nd5 | 1.6921 | v5 | 54.57 |
| R10 | −11.087 | d10= 0.000 | | | | |
| R11 | −11.087 | d11= 0.806 | nd6 | 1.9229 | v6 | 18.90 |
| R12 | 26.794 | d12= 0.600 | | | | |
| R13 | 14.641 | d13= 4.000 | nd7 | 1.5891 | v7 | 61.16 |
| R14 | −10.000 | d14= 0.403 | | | | |
| R15 | ∞ | d15= 0.400 | ndg | 1.5168 | vg | 64.21 |
| R16 | ∞ | d16= 9.209 | | | | |

Table 18 shows aspheric surface data of the first lens L1, the second lens L2 and the seventh lens L7 in the camera optical lens 50 according to Embodiment 5 of the present disclosure.

TABLE 18

| | Conic coefficient | Aspheric coefficient | | | | |
|---|---|---|---|---|---|---|
| | k | A4 | A6 | A8 | A10 | A12 |
| R1 | 1.2702E+02 | 1.5541E−03 | −8.3040E−05 | 4.1280E−06 | −1.0898E−07 | 8.3786E−10 |
| R2 | 2.3390E+00 | 1.5610E−03 | −9.4194E−05 | 9.4331E−06 | −7.9449E−07 | 5.7644E−08 |
| R3 | 5.2620E+01 | −4.8282E−04 | 1.7696E−04 | −2.1534E−05 | 2.4182E−06 | −4.3223E−08 |
| R4 | 7.3128E−01 | −8.7169E−04 | 1.0347E−04 | −2.2897E−05 | 2.7479E−06 | −9.6706E−08 |
| R13 | −1.0927E+01 | −4.7085E−05 | −9.1800E−06 | 8.8604E−08 | 1.2889E−09 | −1.2247E−10 |
| R14 | −2.7369E+00 | −1.8288E−04 | −3.6583E−06 | 4.0908E−08 | −4.2052E−10 | −4.6208E−11 |

Design data of the inflection point and the arrest point of each lens in the camera optical lens 50 according to Embodiment 5 of the present disclosure are shown in Tables 19 and 20.

TABLE 19

| | Number of inflection points | Inflection point 1 |
|---|---|---|
| P1R1 | 0 | / |
| P1R2 | 0 | / |
| P2R1 | 1 | 2.255 |
| P2R2 | 0 | / |
| P3R1 | 0 | / |
| P3R2 | 0 | / |
| P4R1 | 0 | / |
| P4R2 | 0 | / |
| P5R1 | 0 | / |
| P5R2 | 0 | / |
| P6R1 | 0 | / |
| P6R2 | 0 | / |
| P7R1 | 1 | 3.385 |
| P7R2 | 0 | / |

TABLE 20

| | Number of arrest points | Arrest point1 |
|---|---|---|
| P1R1 | 0 | / |
| P1R2 | 0 | / |
| P2R1 | 1 | 2.945 |
| P2R2 | 0 | / |
| P3R1 | 0 | / |
| P3R2 | 0 | / |
| P4R1 | 0 | / |
| P4R2 | 0 | / |
| P5R1 | 0 | / |
| P5R2 | 0 | / |
| P6R1 | 0 | / |
| P6R2 | 0 | / |
| P7R1 | 1 | 5.195 |
| P7R2 | 0 | / |

Figure 18:
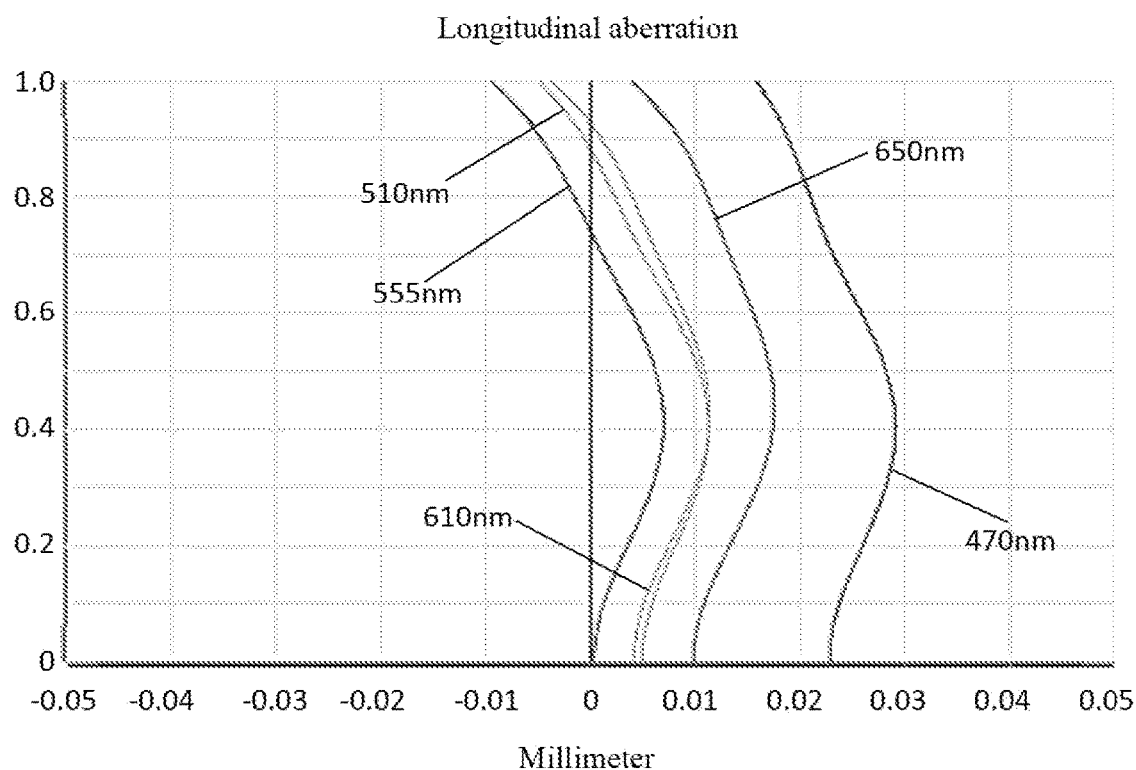
FIG. 18 is a schematic diagram of a longitudinal aberration of the camera optical lens shown in FIG. 17.
Figure 19:
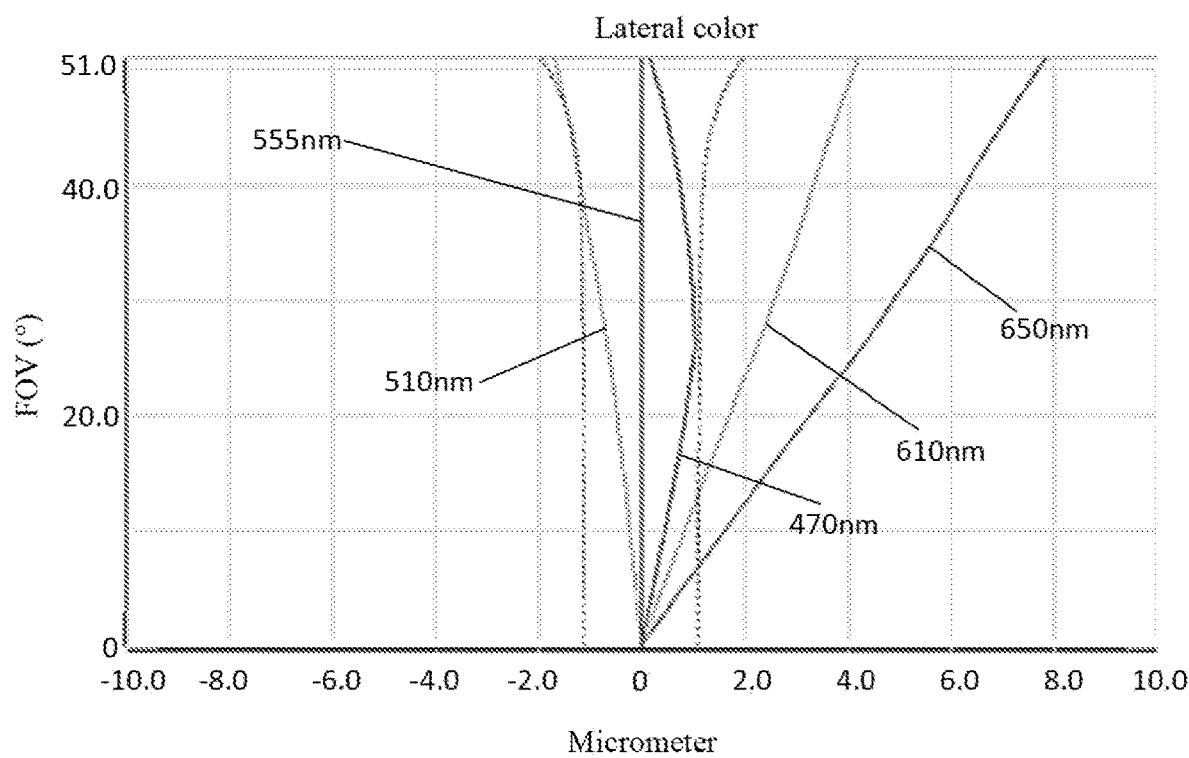
FIG. 19 is a schematic diagram of a lateral color of the camera optical lens shown in FIG. 17.
Figure 20:
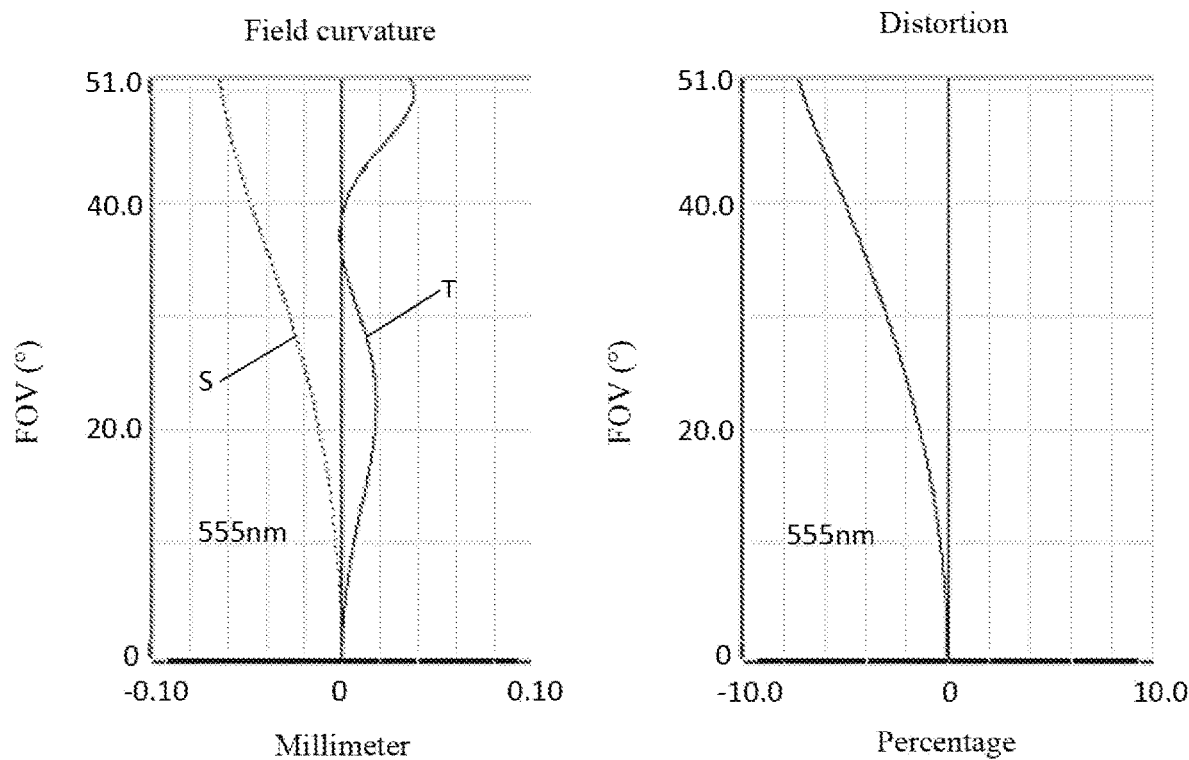
FIG. 20 is a schematic diagram of a field curvature and a distortion of the camera optical lens shown in FIG. 17.

FIG. 18 and FIG. 19 are schematic diagrams of a longitudinal aberration and a lateral color of the camera optical lens 50 after light having a wavelength of 650 nm, 610 nm, 555 nm, 510 nm and 470 nm passes through the camera optical lens 50 according to Embodiment 5, respectively. FIG. 20 is a schematic diagram of a field curvature and a distortion after light having a wavelength of 555 nm passes through the camera optical lens 50 according to Embodiment 5. The field curvature S in FIG. 20 is a field curvature in a sagittal direction, and T is a field curvature in a meridional direction.

Table 29 below lists the corresponding values of each condition in this embodiment according to the above conditions. It can be appreciated that the camera optical lens 50 of this embodiment satisfies the above conditions.

In this embodiment, the camera optical lens 50 has an entrance pupil diameter ENPD of 3.943 mm, a full-field image height IH of 5.145 mm, and a field of view FOV of 100.80° in a diagonal direction. The camera optical lens 50 has good optical performance such as large aperture, ultra-thinness and wide angle while taking into account characteristics of miniaturization, small chromatic aberration, small lateral color, high resolution up to 5M, and also has a long back focal length for easy assembling and low cost.

Embodiment 6

Figure 21:
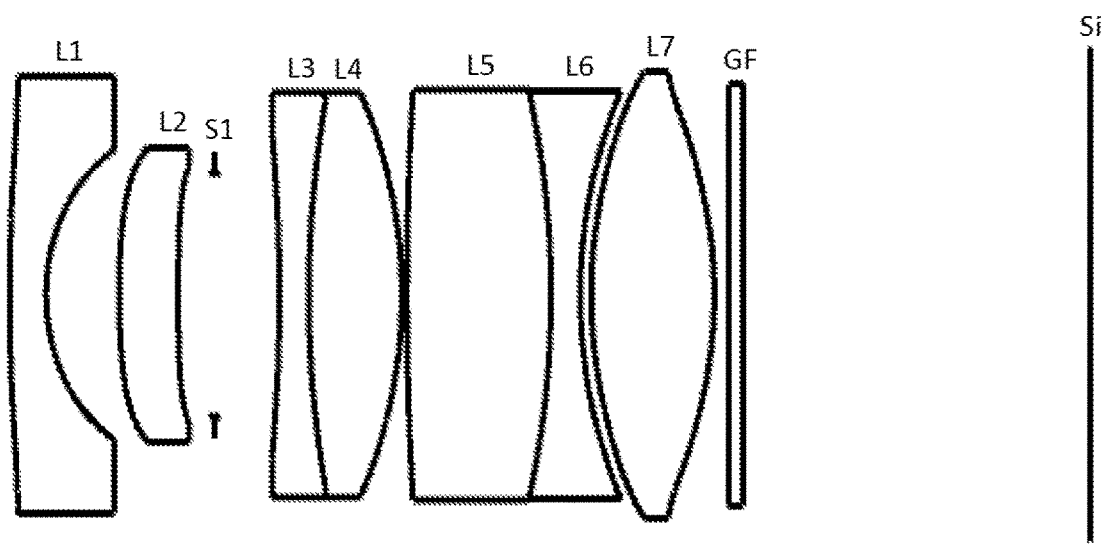
FIG. 21 is a structural schematic diagram of a camera optical lens according to Embodiment 6 of the present disclosure.

FIG. 21 is a structural schematic diagram of a camera optical lens 30 according to Embodiment 6 of the present disclosure. Embodiment 6 is basically the same as Embodiment 1, and involves symbols having the same meanings as Embodiment 1, and only differences therebetween are listed below.

In this embodiment, the object-side surface of the second lens L2 is convex in the paraxial region, and the image-side surface of the second lens L2 is concave in the paraxial region.

Design data of the camera optical lens 60 of Embodiment 6 of the present disclosure are shown in Tables 21 and 22.

TABLE 21

| | R | | d | | nd | | vd |
|---|---|---|---|---|---|---|---|
| R1 | 50.000 | d1= | 1.000 | nd1 | 1.7433 | v1 | 49.34 |
| R2 | 4.156 | d2= | 2.000 | | | | |
| R3 | 17.804 | d3= | 1.611 | nd2 | 1.7433 | v2 | 49.40 |
| R4 | 46.943 | d4= | 1.000 | | | | |
| S1 | ∞ | d0= | 1.800 | | | | |
| R5 | −34.352 | d5= | 0.806 | nd3 | 1.5174 | v3 | 52.19 |
| R6 | 21.623 | d6= | 0.000 | | | | |
| R7 | 21.623 | d7= | 2.551 | nd4 | 1.9537 | v4 | 32.32 |
| R8 | −9.900 | d8= | 0.133 | | | | |
| R9 | 64.025 | d9= | 3.974 | nd5 | 1.8040 | v5 | 46.57 |
| R10 | −18.191 | d10= | 0.000 | | | | |
| R11 | −18.191 | d11= | 0.806 | nd6 | 1.9229 | v6 | 18.90 |
| R12 | 10.317 | d12= | 0.300 | | | | |
| R13 | 9.576 | d13= | 3.370 | nd7 | 1.6180 | v7 | 63.41 |
| R14 | −8.807 | d14= | 0.403 | | | | |
| R15 | ∞ | d15= | 0.400 | ndg | 1.5168 | vg | 64.21 |
| R16 | ∞ | d16= | 9.530 | | | | |

Table 22 shows aspheric surface data of the first lens L1, the second lens L2 and the seventh lens L7 in the camera optical lens 60 according to Embodiment 6 of the present disclosure.

TABLE 22

| | Conic coefficient | Aspheric coefficient | | | | |
|---|---|---|---|---|---|---|
| | k | A4 | A6 | A8 | A10 | A12 |
| R1 | 9.4237E+01 | 3.8021E−04 | −1.6748E−05 | −1.4253E−06 | 7.5532E−08 | −1.3466E−09 |
| R2 | 1.5000E−01 | 8.2072E−04 | 6.2833E−05 | −2.7321E−06 | 6.4190E−07 | −6.8938E−08 |
| R3 | 2.3873E+01 | 1.0533E−03 | 9.4246E−05 | 5.6581E−06 | −5.1195E−07 | 2.0080E−08 |
| R4 | 2.3909E+02 | 1.1012E−03 | 1.0540E−04 | −1.8156E−06 | 3.9743E−08 | 3.5081E−08 |
| R13 | −1.6031E+00 | −5.8426E−07 | 5.0444E−06 | −2.0656E−07 | −1.6793E−09 | 6.3518E−10 |
| R14 | −2.4235E+00 | −1.3177E−04 | −6.9161E−06 | 1.0693E−06 | −6.8456E−08 | 1.9823E−09 |

Design data of the inflection point and the arrest point of each lens in the camera optical lens 60 according to Embodiment 6 of the present disclosure are shown in Tables 23 and 24.

TABLE 23

| | Number of inflection points | Inflection point 1 | Inflection point 2 |
|---|---|---|---|
| P1R1 | 2 | 3.305 | 4.715 |
| P1R2 | 0 | / | / |
| P2R1 | 0 | / | / |
| P2R2 | 0 | / | / |
| P3R1 | 0 | / | / |
| P3R2 | 0 | / | / |
| P4R1 | 0 | / | / |
| P4R2 | 0 | / | / |
| P5R1 | 0 | / | / |
| P5R2 | 0 | / | / |
| P6R1 | 0 | / | / |
| P6R2 | 0 | / | / |
| P7R1 | 0 | / | / |
| P7R2 | 0 | / | / |

TABLE 24

| | Number of arrest points | Arrest point1 |
|---|---|---|
| P1R1 | 0 | / |
| P1R2 | 0 | / |
| P2R1 | 0 | / |
| P2R2 | 0 | / |
| P3R1 | 0 | / |
| P3R2 | 0 | / |
| P4R1 | 0 | / |
| P4R2 | 0 | / |
| P5R1 | 0 | / |
| P5R2 | 0 | / |
| P6R1 | 0 | / |
| P6R2 | 0 | / |
| P7R1 | 0 | / |
| P7R2 | 0 | / |

Figure 22:
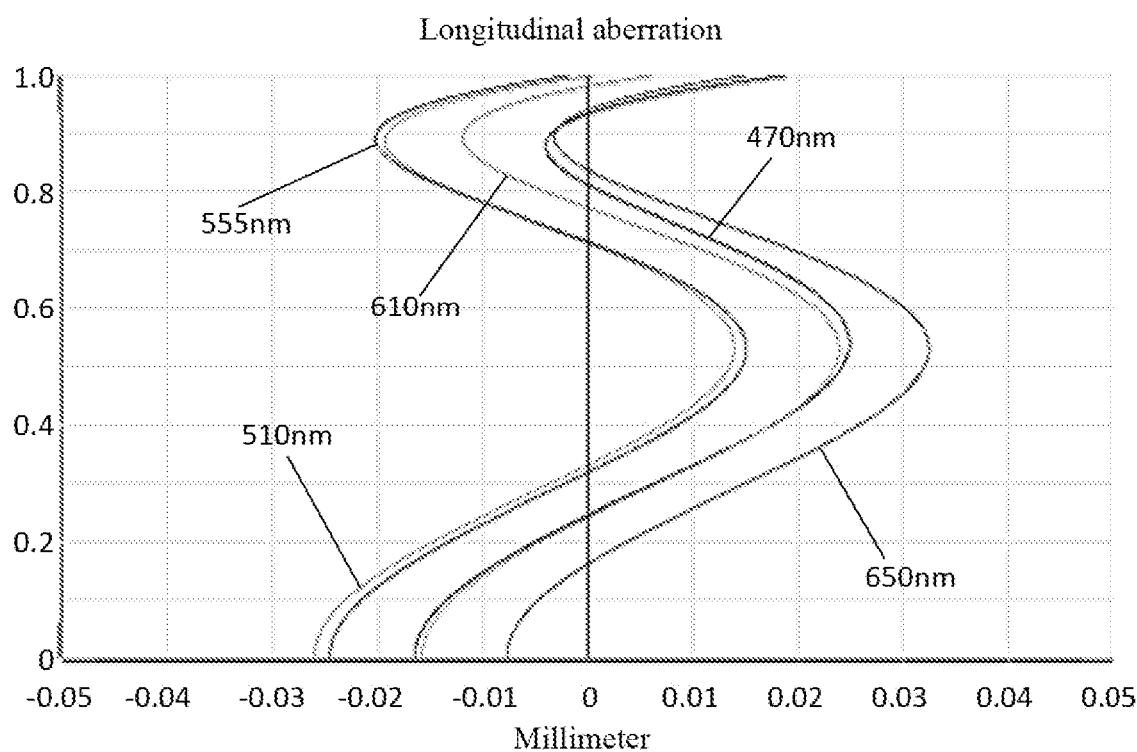
FIG. 22 is a schematic diagram of a longitudinal aberration of the camera optical lens shown in FIG. 21.
Figure 23:
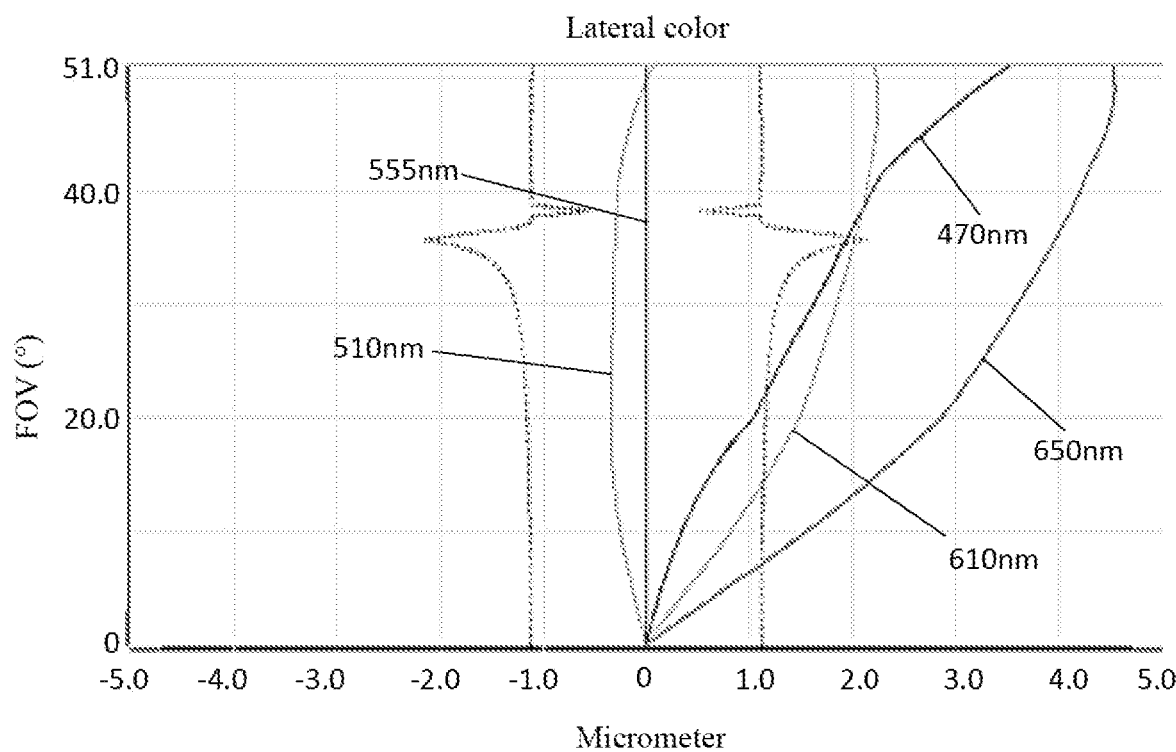
FIG. 23 is a schematic diagram of a lateral color of the camera optical lens shown in FIG. 21.
Figure 24:
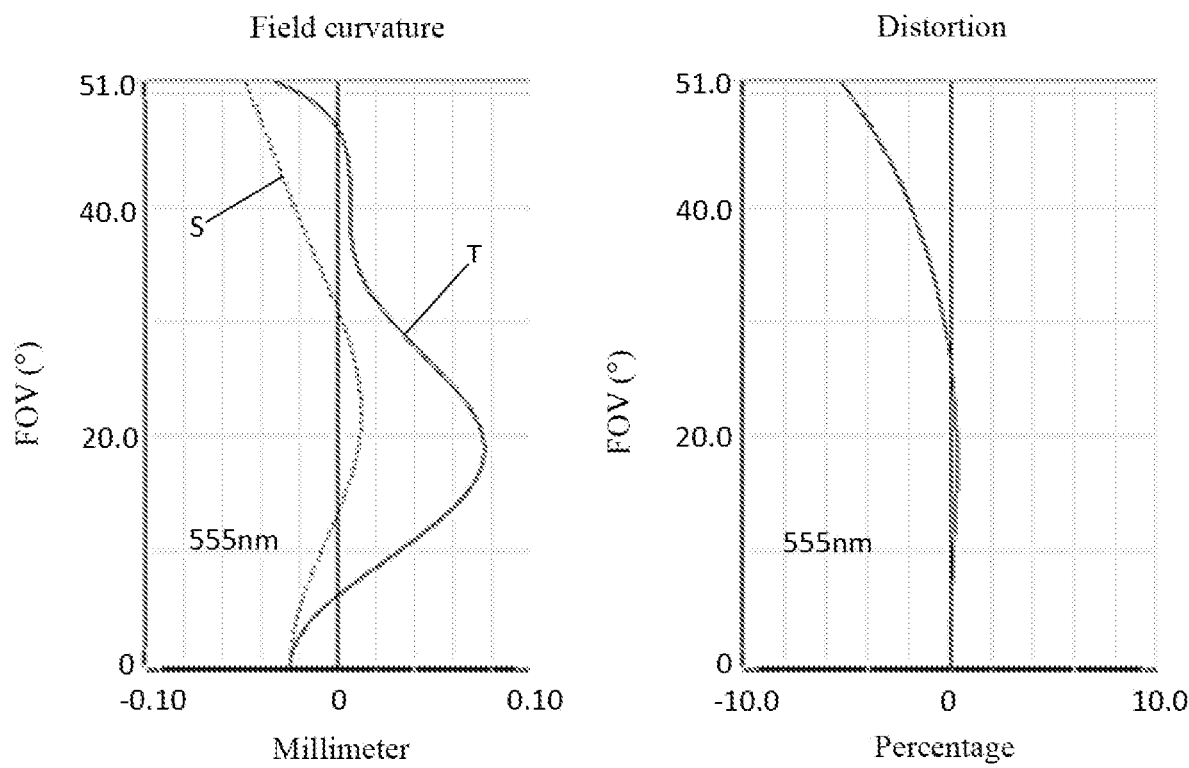
FIG. 24 is a schematic diagram of a field curvature and a distortion of the camera optical lens shown in FIG. 21.

FIG. 22 and FIG. 23 are schematic diagrams of a longitudinal aberration and a lateral color of the camera optical lens 60 after light having a wavelength of 650 nm, 610 nm, 555 nm, 510 nm and 470 nm passes through the camera optical lens 60 according to Embodiment 6, respectively. FIG. 24 is a schematic diagram of a field curvature and a distortion after light having a wavelength of 555 nm passes through the camera optical lens 60 according to Embodiment 6. The field curvature S in FIG. 24 is a field curvature in a sagittal direction, and T is a field curvature in a meridional direction.

Table 29 below lists the corresponding values of each condition in this embodiment according to the above conditions. It can be appreciated that the camera optical lens 60 of this embodiment satisfies the above conditions.

In this embodiment, the camera optical lens 60 has an entrance pupil diameter ENPD of 3.586 mm, a full-field image height IH of 5.145 mm, and a field of view FOV 102.20° in a diagonal direction. The camera optical lens 60 has good optical performance such as large aperture, ultra-thinness and wide angle while taking into account characteristics of miniaturization, small chromatic aberration, small lateral color, high resolution up to 5M, and also has a long back focal length for easy assembling and low cost.

Comparative Example 1

Figure 25:
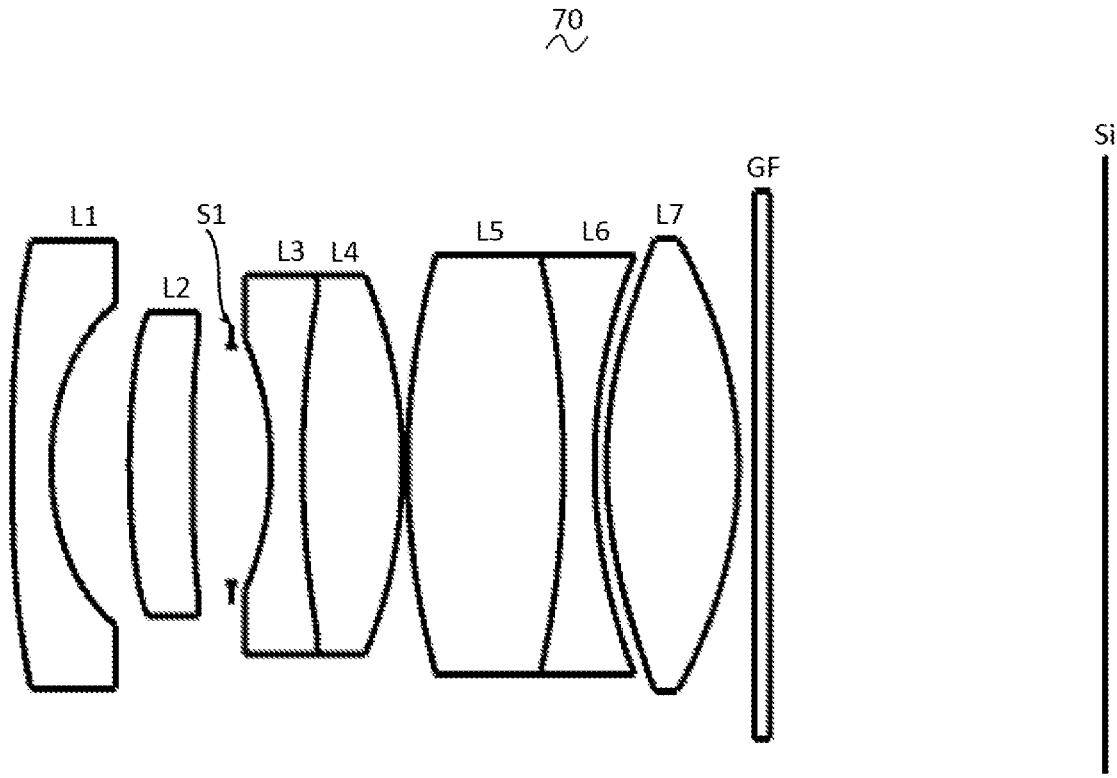
FIG. 25 is a structural schematic diagram of a camera optical lens according to Comparative Example 1 of the present disclosure.

FIG. 25 is a structural schematic diagram of a camera optical lens 70 according to Comparative Example 1 of the present disclosure. Comparative Example 1 is basically the same as Embodiment 1, and involves symbols having the same meanings as Embodiment 1, and only differences therebetween are listed below.

In Comparative Example 1, the second lens L2 has a negative refractive power. The object-side surface of the second lens L2 is convex in the paraxial region, and the image-side surface of the second lens L2 is concave in the paraxial region.

Design data of the camera optical lens 70 of Comparative Example 1 of the present disclosure are shown in Tables 25 and 26.

TABLE 25

|  | R |  | d |  | nd |  | vd |
|---|---|---|---|---|---|---|---|
| R1 | 50.000 | d1= | 1.000 | nd1 | 1.7725 | v1 | 49.61 |
| R2 | 5.323 | d2= | 2.000 |  |  |  |  |
| R3 | 16.938 | d3= | 1.611 | nd2 | 1.7433 | v2 | 49.40 |
| R4 | 49.397 | d4= | 1.000 |  |  |  |  |
| S1 | ∞ | d0= | 1.000 |  |  |  |  |
| R5 | −6.112 | d5= | 0.806 | nd3 | 1.5174 | v3 | 52.19 |
| R6 | 18.922 | d6= | 0.000 |  |  |  |  |
| R7 | 18.922 | d7= | 2.551 | nd4 | 1.9537 | v4 | 32.32 |
| R8 | −9.689 | d8= | 0.133 |  |  |  |  |
| R9 | 15.061 | d9= | 3.974 | nd5 | 1.6921 | v5 | 54.57 |
| R10 | −18.419 | d10= | 0.000 |  |  |  |  |
| R11 | −18.419 | d11= | 0.806 | nd6 | 1.9229 | v6 | 18.90 |
| R12 | 11.079 | d12= | 0.300 |  |  |  |  |
| R13 | 8.745 | d13= | 3.370 | nd7 | 1.6180 | v7 | 63.41 |
| R14 | −7.833 | d14= | 0.403 |  |  |  |  |
| R15 | ∞ | d15= | 0.400 | ndg | 1.5168 | vg | 64.21 |
| R16 | ∞ | d16= | 8.580 |  |  |  |  |

Table 26 shows aspheric surface data of the first lens L1, the second lens L2 and the seventh lens L7 in the camera optical lens 70 of the Comparative Example 1 of the present disclosure.

TABLE 26

| | Conic coefficient | Aspheric coefficient | | | | |
|---|---|---|---|---|---|---|
| | k | A4 | A6 | A8 | A10 | A12 |
| R1 | 8.8071E+01 | 6.7896E−04 | −2.1167E−05 | 3.3667E−08 | 1.3424E−08 | −5.1776E−10 |
| R2 | 4.7917E−01 | 4.9019E−04 | −2.9033E−06 | 2.9396E−06 | −3.6912E−07 | 3.0765E−08 |
| R3 | −5.9390E+00 | 1.3867E−04 | 1.8942E−05 | 3.0625E−06 | 2.4364E−07 | 6.7089E−09 |
| R4 | 2.4263E+02 | 2.3132E−05 | 9.8727E−06 | 1.7878E−06 | 1.7838E−07 | 1.9753E−08 |
| R13 | −2.7427E+00 | −4.8109E−05 | 7.0907E−07 | −1.8973E−08 | 2.5524E−10 | −6.0620E−11 |
| R14 | −1.9943E+00 | −5.5232E−05 | −6.9793E−06 | 1.7321E−07 | 3.5475E−09 | −2.4854E−10 |

Design data of the inflection point and the arrest point of each lens in the camera optical lens 70 according to Comparative Example 1 of the present disclosure are shown in Tables 27 and 78

TABLE 27

|  | Number of inflection points | Inflection point 1 |
|---|---|---|
| P1R1 | 0 | / |
| P1R2 | 0 | / |
| P2R1 | 0 | / |
| P2R2 | 0 | / |
| P3R1 | 0 | / |
| P3R2 | 0 | / |
| P4R1 | 0 | / |
| P4R2 | 0 | / |
| P5R1 | 0 | / |
| P5R2 | 0 | / |
| P6R1 | 0 | / |
| P6R2 | 0 | / |
| P7R1 | 1 | 4.805 |
| P7R2 | 0 | / |

TABLE 28

|  | Number of arrest points | Arrest point1 |
|---|---|---|
| P1R1 | 0 | / |
| P1R2 | 0 | / |
| P2R1 | 0 | / |
| P2R2 | 0 | / |
| P3R1 | 0 | / |
| P3R2 | 0 | / |
| P4R1 | 0 | / |
| P4R2 | 0 | / |
| P5R1 | 0 | / |
| P5R2 | 0 | / |
| P6R1 | 0 | / |
| P6R2 | 0 | / |
| P7R1 | 0 | / |
| P7R2 | 0 | / |

Figure 26:
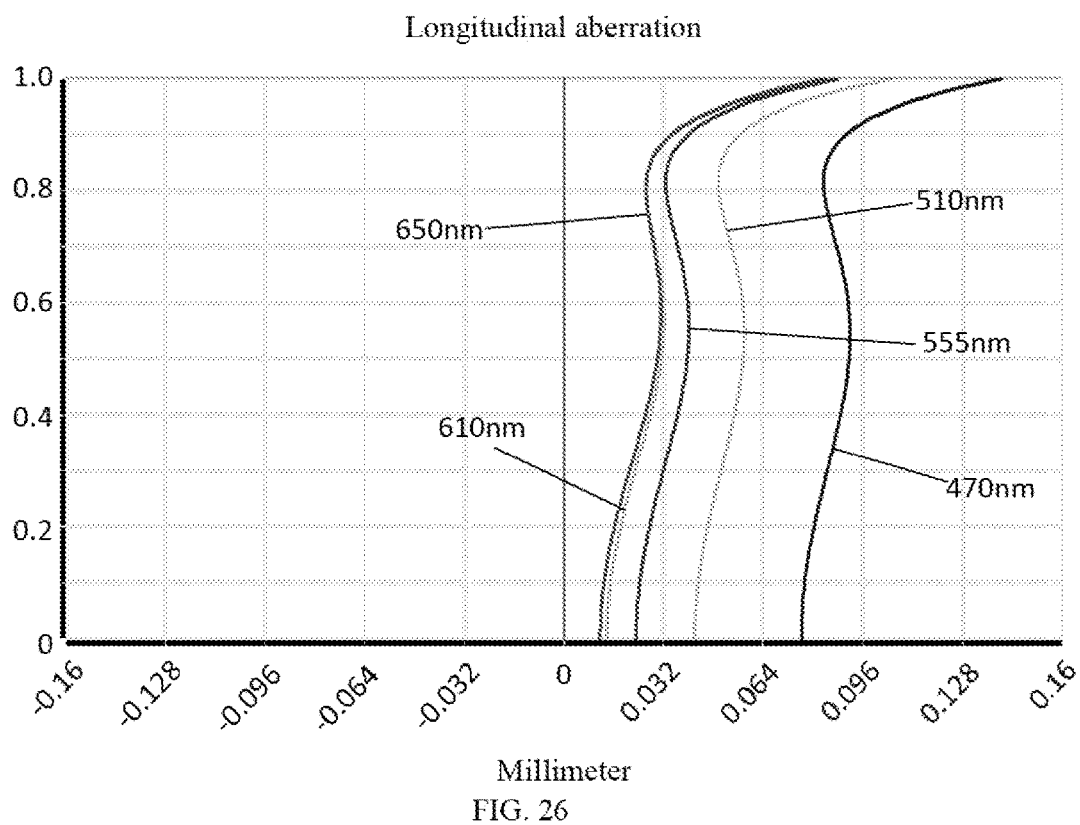
FIG. 26 is a schematic diagram of a longitudinal aberration of the camera optical lens shown in FIG. 25.
Figure 27:
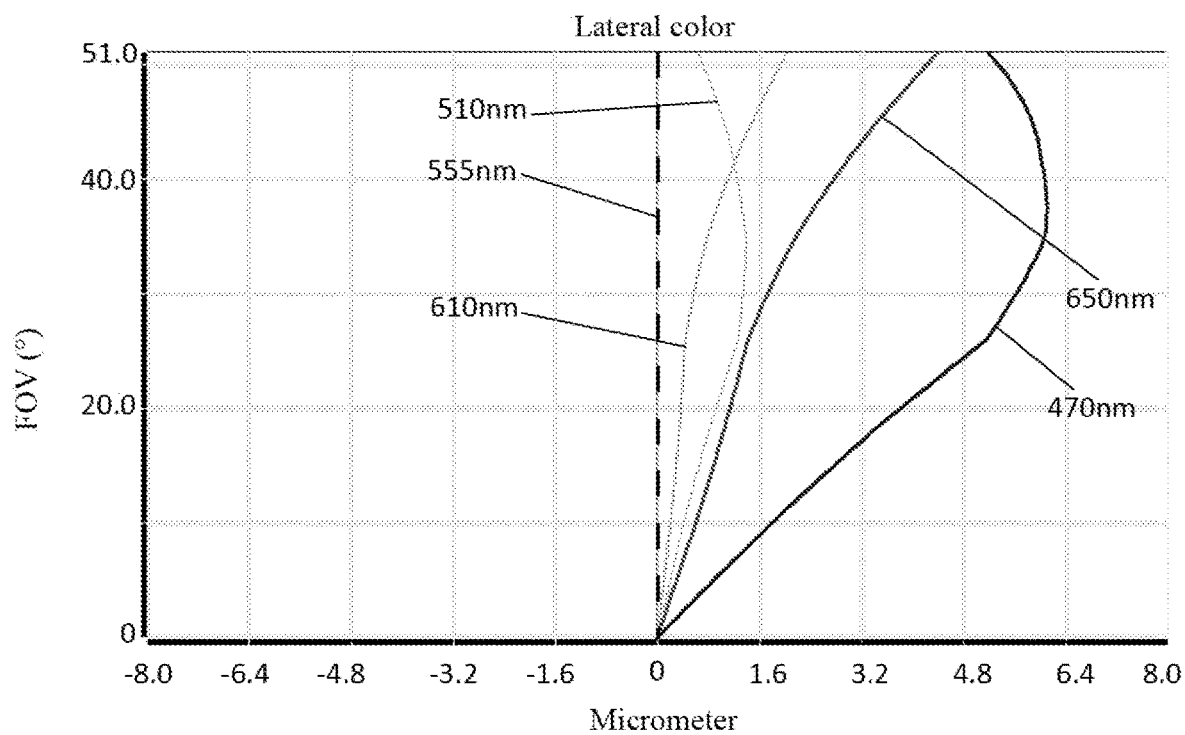
FIG. 27 is a schematic diagram of a lateral color of the camera optical lens shown in FIG. 25.
Figure 28:
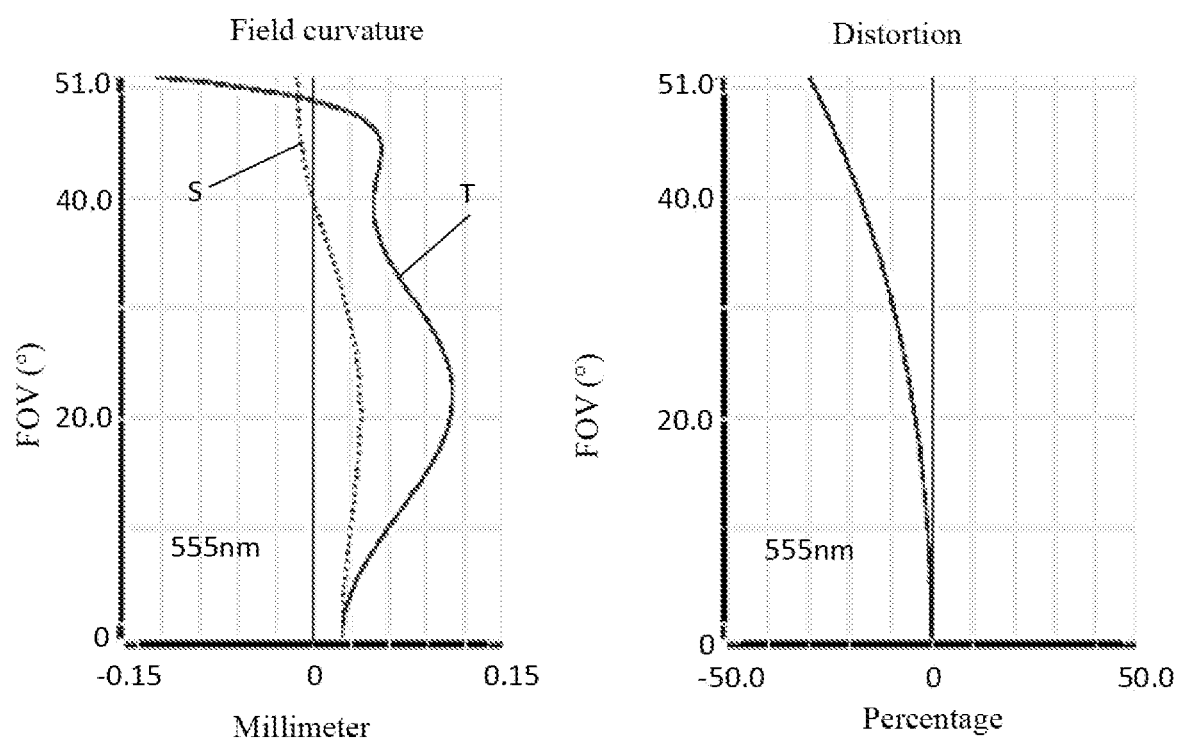
FIG. 28 is a schematic diagram of a field curvature and a distortion of the camera optical lens shown in FIG. 25.

FIG. 26 and FIG. 27 are schematic diagrams of a longitudinal aberration and a lateral color of the camera optical lens 70 after light having a wavelength of 650 nm, 610 nm, 555 nm, 510 nm and 470 nm passes through the camera optical lens 70 according to Comparative Example 1, respectively. FIG. 28 is a schematic diagram of a field curvature and a distortion after light having a wavelength of 555 nm passes through the camera optical lens 70 according to Comparative Example 1. The field curvature S in FIG. 28 is a field curvature in a sagittal direction, and T is a field curvature in a meridional direction.

Table 29 below lists the corresponding values of each condition in this embodiment according to the above conditions. It can be appreciated that the camera optical lens 70 of Comparative Example 1 does not satisfy the following condition: $1.30 \leq f7/f \leq 4.00$.

In Comparative Example 1, the camera optical lens 70 has an entrance pupil diameter ENPD of 3.713 mm, a full-field image height IH of 5.145 mm, and a field of view FOV of 104.20° in a diagonal direction. The aberration of the camera optical lens 70 is not fully corrected, which is not beneficial to reducing the diameter of front opening, so that its optical performance is not excellent enough.

TABLE 29

| Parameters and conditions | Embodiment 1 | Embodiment 2 | Embodiment 3 | Embodiment 4 | Embodiment 5 | Embodiment 6 | Comparative Example 1 |
|---|---|---|---|---|---|---|---|
| f7/f | 1.59 | 1.39 | 1.99 | 3.95 | 1.69 | 1.31 | 1.22 |
| n1 | 1.77 | 1.77 | 1.77 | 1.88 | 1.81 | 1.74 | 1.77 |
| f34/f | 2.89 | 2.52 | 3.44 | 2.08 | 6.95 | 3.12 | 3.33 |
| (FOV × f)/IH | 125.79 | 124.81 | 124.92 | 124.31 | 124.09 | 121.09 | 120.31 |
| f | 6.320 | 6.289 | 6.264 | 6.258 | 6.334 | 6.096 | 5.940 |
| f1 | −9.750 | −7.160 | −6.358 | −5.598 | −8.899 | −6.133 | −7.760 |
| f2 | 81.851 | 34.602 | 79.643 | 18.730 | −33.138 | 37.558 | −9.131 |
| f3 | −8.128 | −13.169 | 7.409 | −30.866 | −6.554 | −25.480 | −8.801 |
| f4 | 6.967 | 8.114 | −10.255 | 9.909 | 7.241 | 7.373 | 6.986 |
| f5 | 11.326 | 12.799 | 6.519 | 9.319 | 9.584 | 17.938 | 12.542 |
| f6 | −8.262 | −8.200 | −8.150 | −8.998 | −8.333 | −6.972 | −7.329 |
| f7 | 10.020 | 8.741 | 12.442 | 24.715 | 10.701 | 7.960 | 7.229 |
| FNO | 1.600 | 1.600 | 1.600 | 1.600 | 1.606 | 1.700 | 1.600 |
| TTL | 30.004 | 28.180 | 27.530 | 29.015 | 30.000 | 29.684 | 27.934 |
| IH | 5.145 | 5.145 | 5.145 | 5.145 | 5.145 | 5.145 | 5.145 |
| FOV | 102.40° | 102.10° | 102.60° | 102.20° | 100.80° | 102.20° | 104.20° |
| D | 4.617 | 4.763 | 4.545 | 4.384 | 4.884 | 5.009 | 4.956 |
| f34 | 18.254 | 15.880 | 21.553 | 13.000 | 44.000 | 18.99 | 19.756 |

FOV denotes a field of view of the camera optical lens in a diagonal direction.

The above are only preferred embodiments of the present disclosure. Here, it should be noted that those skilled in the art may make modifications without departing from the inventive concept of the present disclosure, but these shall fall into the protection scope of the present disclosure.

What is claimed is:

1. A camera optical lens, comprising from an object side to an image side:
a first lens;
a second lens;
a third lens;
a fourth lens;
a fifth lens;
a sixth lens; and
a seventh lens,
wherein the camera optical lens satisfies following conditions:

$$1.30 \leq f7/f \leq 4.00;$$
$$1.70 \leq n1;$$
$$2.00 \leq f34/f \leq 7.00; \text{ and}$$
$$120.00 \leq (FOV \times f)/IH$$

where
f denotes a focal length of the camera optical lens;
f7 denotes a focal length of the seventh lens;
f34 denotes a combined focal length of the third lens and the fourth lens;
n1 denotes a refractive index of the first lens;
FOV denotes a field of view of the camera optical lens; and
IH denotes an image height of the camera optical lens.

2. The camera optical lens as described in claim 1, wherein the camera optical lens satisfies a following condition:

$$1.00 \leq f5/f \leq 3.00;$$

where f5 denotes a focal length of the fifth lens.

3. The camera optical lens as described in claim 1, wherein the camera optical lens satisfies following conditions:

$$d10 = 0; \text{ and}$$
$$0.40 \leq |f5/f6| \leq 3.00,$$

where
d10 denotes an on-axis distance from an image-side surface of the fifth lens to an object-side surface of the sixth lens;
f5 denotes a focal length of the fifth lens; and
f6 denotes a focal length of the sixth lens.

4. The camera optical lens as described in claim 1, wherein the camera optical lens satisfies a following condition:

$$0.35 \leq BF/TL,$$

where
BF denotes an on-axis distance from an image-side surface of the seventh lens to an image plane of the camera optical lens; and
TL denotes an on-axis distance from an object-side surface of the first lens to the image-side surface of the seventh lens.

5. The camera optical lens as described in claim 1, wherein the camera optical lens satisfies a following condition:

$$0.01 \leq (d4 + d0)/TTL \leq 0.10;$$

where
d4 denotes an on-axis distance from an image-side surface of the second lens to an aperture;
d0 denotes an on-axis distance from the aperture to an object-side surface of the third lens; and TTL denotes a total optical length from an object-side surface of the first lens to an image plane of the camera optical lens along an optic axis.

6. The camera optical lens as described in claim 1, wherein the camera optical lens satisfies a following condition:

$$0 < D/IH/FOV \le 0.10;$$

where
D denotes a diameter of a light passing opening of an object-side surface of the first lens corresponding to a maximum field of view of the camera optical lens.

7. The camera optical lens as described in claim 1, wherein the camera optical lens satisfies a following condition:

$$0 < TTL/IH/FOV \le 0.06;$$

where TTL denotes a total optical length from an object-side surface of the first lens to an image plane of the camera optical lens along an optic axis.

8. The camera optical lens as described in claim 1, wherein the camera optical lens satisfies following conditions:

$$d6 = 0; \text{ and}$$
$$d10 = 0,$$

where
d6 denotes an on-axis distance from an image-side surface of the third lens to an object-side surface of the fourth lens; and
d10 denotes an on-axis distance from an image-side surface of the fifth lens to an object-side surface of the sixth lens.

9. The camera optical lens as described in claim 1, wherein an object-side surface of the first lens is convex in a paraxial region, and an image-side surface of the first lens is concave in the paraxial region;
the first lens has a negative refractive power; and
the camera optical lens satisfies following conditions:

$$-3.09 \le f1/f \le -0.60;$$
$$0.57 \le (R1 + R2)/(R1 - R2) \le 1.88; \text{ and}$$
$$0.02 \le d1/TTL \le 0.05,$$

where
f1 denotes a focal length of the first lens;
R1 denotes a central curvature radius of the object-side surface of the first lens;
R2 denotes a central curvature radius of the image-side surface of the first lens;
d1 denotes an on-axis thickness of the first lens; and
TTL denotes a total optical length from an object-side surface of the first lens to an image plane of the camera optical lens along an optic axis.

10. The camera optical lens as described in claim 1, wherein the camera optical lens satisfies following conditions:

$$-10.46 \le f2/f \le 19.43;$$
$$-4.44 \le (R3 + R4)/(R3 - R4) \le 22.86; \text{ and}$$
$$0.03 \le d3/TTL \le 0.09,$$

where
f2 denotes a focal length of the second lens;
R3 denotes a central curvature radius of an object-side surface of the second lens;
R4 denotes a central curvature radius of an image-side surface of the second lens;
d3 denotes an on-axis thickness of the second lens; and
TTL denotes a total optical length from an object-side surface of the first lens to an image plane of the camera optical lens along an optic axis.

11. The camera optical lens as described in claim 1, wherein the camera optical lens satisfies following conditions:

$$-9.86 \le f3/f \le 1.77;$$
$$-1.65 \le (R5 + R6)/(R5 - R6) \le 0.53; \text{ and}$$
$$0.01 \le d5/TTL \le 0.14,$$

where
f3 denotes a focal length of the third lens;
R5 denotes a central curvature radius of an object-side surface of the third lens;
R6 denotes a central curvature radius of an image-side surface of the third lens;
d5 denotes an on-axis thickness of the third lens; and
TTL denotes a total optical length from an object-side surface of the first lens to an image plane of the camera optical lens along an optic axis.

12. The camera optical lens as described in claim 1, wherein the camera optical lens satisfies following conditions:

$$-3.27 \le f4/f \le 2.38;$$
$$-0.14 \le (R7 + R8)/(R7 - R8) \le 1.27; \text{ and}$$
$$0.01 \le d7/TTL \le 0.23,$$

where
f4 denotes a focal length of the fourth lens;
R7 denotes a central curvature radius of an object-side surface of the fourth lens;
R8 denotes a central curvature radius of an image-side surface of the fourth lens;
d7 denotes an on-axis thickness of the fourth lens; and
TTL denotes a total optical length from an object-side surface of the first lens to an image plane of the camera optical lens along an optic axis.

13. The camera optical lens as described in claim 1, wherein an object-side surface of the fifth lens is convex in a paraxial region and an image-side surface of the fifth lens is convex in the paraxial region;

the fifth lens has positive refractive power;
the camera optical lens satisfies following conditions:

$$-0.42 \le (R9 + R10)/(R9 - R10) \le 0.84; \text{ and}$$

$$0.05 \le d9/TTL \le 0.22,$$

where
R9 denotes a central curvature radius of an object-side surface of the fifth lens;
R10 denotes a central curvature radius of an image-side surface of the fifth lens;
d9 denotes an on-axis thickness of the fifth lens; and
TTL denotes a total optical length from an object-side surface of the first lens to an image plane of the camera optical lens along an optic axis.

14. The camera optical lens as described in claim 1, wherein an object-side surface of the sixth lens is concave in a paraxial region;
the sixth lens has negative refractive power;
the camera optical lens satisfies following conditions:

$$-2.88 \le f6/f \le -0.76;$$

$$-2.78 \le (R11 + R12)/(R11 - R12) \le 0.42; \text{ and}$$

$$0.01 \le d11/TTL \le 0.16,$$

where
f6 denotes a focal length of the sixth lens;
R11 denotes a central curvature radius of an object-side surface of the sixth lens;
R12 denotes a central curvature radius of an image-side surface of the sixth lens;
d11 denotes an on-axis thickness of the sixth lens; and
TTL denotes a total optical length from an object-side surface of the first lens to an image plane of the camera optical lens along an optic axis.

15. The camera optical lens as described in claim 1, wherein an object-side surface of the seventh lens is convex in a paraxial region, and an image-side surface of the seventh lens is convex in the paraxial region;
the seventh lens has positive refractive power;
the camera optical lens satisfies following conditions:

$$-0.50 \le (R13 + R14)/(R13 - R14) \le 0.28; \text{ and}$$

$$0.05 \le d13/TTL \le 0.20,$$

where
R13 denotes a central curvature radius of an object-side surface of the seventh lens;
R14 denotes a central curvature radius of an image-side surface of the seventh lens;
d13 denotes an on-axis thickness of the seventh lens; and
TTL denotes a total optical length from an object-side surface of the first lens to an image plane of the camera optical lens along an optic axis.

16. The camera optical lens as described in claim 1, wherein at least one of the first lens, the second lens, the third lens, the fourth lens, the fifth lens, the sixth lens, and the seventh lens is made of glass material.

\* \* \* \* \*